(12) United States Patent
Shade et al.

(10) Patent No.: US 11,781,664 B2
(45) Date of Patent: Oct. 10, 2023

(54) VALVE POPPETS AND VALVE SEATS FOR HIGH-SPEED RECIPROCATING COMPRESSOR CAPACITY UNLOADERS

(71) Applicant: ACI SERVICES, INC., Cambridge, OH (US)

(72) Inventors: W. Norman Shade, Port Clinton, OH (US); David W. Legg, Marietta, OH (US)

(73) Assignee: ACI SERVICES, INC., Cambridge, OH (US)

( * ) Notice: Subject to any disclaimer, the term of this patent is extended or adjusted under 35 U.S.C. 154(b) by 241 days.

(21) Appl. No.: 17/235,167

(22) Filed: Apr. 20, 2021

(65) Prior Publication Data

US 2021/0332902 A1    Oct. 28, 2021

Related U.S. Application Data

(60) Provisional application No. 63/014,293, filed on Apr. 23, 2020.

(51) Int. Cl.
| | | |
|---|---|---|
| *F16K 17/10* | (2006.01) | |
| *F16K 5/04* | (2006.01) | |
| *F04B 39/10* | (2006.01) | |

(52) U.S. Cl.
CPC .......... *F16K 17/10* (2013.01); *F04B 39/1013* (2013.01); *F16K 5/0464* (2013.01)

(58) Field of Classification Search
CPC .... F16K 17/10; F16K 5/0464; F04B 39/1013; F04B 49/03; F04B 39/125; F04B 39/0276
See application file for complete search history.

(56) References Cited

U.S. PATENT DOCUMENTS

| | | | | |
|---|---|---|---|---|
| 2,094,951 A | * | 10/1937 | Kowan | F04B 39/1013 137/538 |
| 2,498,483 A | * | 2/1950 | Campbell | F16K 17/10 91/387 |
| 3,602,247 A | * | 8/1971 | Bunn | F16K 15/06 137/512.1 |
| 4,447,193 A | * | 5/1984 | Bunn | F04B 49/225 417/441 |
| 4,489,752 A | * | 12/1984 | Deminski | F16K 47/0112 137/512.1 |
| 4,872,481 A | * | 10/1989 | Shaw | F04B 53/1087 137/543.13 |
| 5,695,325 A | | 12/1997 | Sperry | |
| 6,361,288 B1 | | 3/2002 | Sperry | |
| 6,607,366 B2 | | 8/2003 | Sperry | |

(Continued)

*Primary Examiner* — Craig J Price
*Assistant Examiner* — Andrew J Rost
(74) *Attorney, Agent, or Firm* — Ronald J. Richter; Nesbitt IP LLC

(57) ABSTRACT

An improved unloader valve assembly for a high-speed reciprocating compressor includes improved poppets and valve seat designs. The improved poppets and valve seats are useful for reducing or eliminating poppet leakage and high impact stresses on the sealing surfaces of the poppets, and are especially intended for use with high-speed reciprocating compressors operating at 1000 rpm and higher. A control chamber spacer plate for creating a control pressure chamber within the unloader valve assembly, and a valve seat cushioning plate for reducing stress on the head ends of the poppets are also described.

24 Claims, 30 Drawing Sheets

(56) References Cited

U.S. PATENT DOCUMENTS

| | | |
|---|---|---|
| 7,959,420 B1 | 6/2011 | Sperry |
| 8,070,461 B2 | 12/2011 | Sanford |
| 8,430,646 B2 | 4/2013 | Shade et al. |
| 9,309,978 B2 | 4/2016 | Hatch et al. |
| 10,662,935 B2 | 5/2020 | Hatch |
| 2001/0039966 A1* | 11/2001 | Walpole .............. F04B 39/1053 137/512.1 |
| 2009/0173403 A1* | 7/2009 | Hunt ................... F04B 39/1013 137/540 |
| 2010/0090149 A1 | 4/2010 | Thompson et al. |
| 2015/0204319 A1* | 7/2015 | Columpsi ............. F16K 15/026 417/559 |

* cited by examiner

VALVE POPPETS AND VALVE SEATS FOR HIGH-SPEED RECIPROCATING COMPRESSOR CAPACITY UNLOADERS

CROSS-REFERENCE TO RELATED APPLICATION

The present application claims the benefit of U.S. Provisional Application Ser. No. 63/014,293 filed Apr. 23, 2020, the disclosure of which is hereby incorporated by reference in its entirety.

FIELD OF THE INVENTION

The present invention relates generally to capacity unloaders for high-speed reciprocating compressors, and in particular to improved poppets and valve seats for the automatic variation of fixed clearance volumes with high-speed reciprocating compressors.

BACKGROUND OF THE INVENTION

Reciprocating compressors are positive displacement machines wherein a reciprocating piston moves back and forth within a fixed cylindrical volume. Specifically, most known reciprocating compressors typically include a cylinder, a piston reciprocally mounted in the cylinder, a rotatable crankshaft driven by an engine or electric motor and connected to the piston, and a suction valve assembly and a discharge valve assembly for selectively communicating suction and discharge lines with the compressor cylinder. Reciprocating compressors are commonly used for a wide range of applications such as the pressurization and transport of natural gas and mixtures of gases through systems used for industrial and commercial processes.

In natural gas applications, transmission through pipelines is commonly accomplished with large reciprocating compressors driven by internal combustion engines at pumping stations located along the pipeline routes. Reciprocating compressors can also be driven by electric motors and other drivers, and they are commonly employed in refineries and chemical process plants to pressurize and move natural gas, hydrogen and many other gases throughout the process facility. Other examples include, but are not limited to, industrial air compression, process refrigeration, and vapor recovery from storage tanks, operating equipment and other processes.

Whether driven by internal combustion engines, electric motors or other means, a reciprocating compressor's capacity is directly related to the fixed geometry built into its compressor cylinder(s). Defined as the total flow rate or output of a compressor, compressor capacity is a function of cylinder displacement and the internal clearance volume remaining in the cylinder when the piston is at the end of its stroke. Cylinder displacement equals the area of the piston end face multiplied by the length of the stroke of the piston.

The extent to which a reciprocating compressor is loaded can have a significant effect on its energy consumption and thus compressor operating efficiency, cost-effectiveness and environmental impact. In the fully-loaded condition, the maximum output of the compressor is achieved, with a resultant full load on the compressor's driver. However, gas flow and pressure requirements can vary considerably, typically depending upon upstream supply conditions as well as downstream demand conditions.

Controlling compressor flow is often accomplished by partially "unloading" a compressor, whereby each compressor stroke produces a reduced gas flow as compared to fully-loaded operation. Reduced gas flow generally corresponds to reduced work performed by the compressor, such that fuel savings and greater efficiency can be achieved. Although compressor output can be varied by changing the speed of the driving engine, this approach can be impractical because the engines are typically designed to operate at constant speeds for maximum fuel efficiency and minimum emissions. Thus, compressor capacity and flow rate control must normally be accomplished using other means, such as by changing the internal clearance volume of the system.

A compressor can be partially unloaded and its output reduced by increasing the clearance volume. Clearance pockets or bottles connected to the compressor cylinder via an unloader valve are often provided for this purpose, for example, either via a fixed volume clearance pocket or a variable volume clearance pocket, either of which are typically located at the outer head of the compressor cylinder. Adding clearance volume reduces the compressor capacity, and removing clearance volume increases the compressor capacity. Clearance pockets (fixed and variable) are commonly referred to as "unloaders" because they can reduce the capacity and therefore "unload" the compressor; manipulation of clearance pockets can also "load" the compressor by removing clearance volume and thus increasing the capacity.

The clearance volume provided by fixed means must be either fully added or fully removed prior to or during operation of the compressor, and cannot be used in a variable manner when the compressor is in operation. In contrast, the volume of a variable clearance pocket can be changed while the compressor is in continuous operation, and is one of the most effective means of changing the compressor capacity and the required power in real time. A variable clearance pocket can be positioned at an infinite number of positions or steps within the range of clearance volumes it is designed to provide. Such devices have been in use throughout the compressor industry for many years.

For example, U.S. Pat. Nos. 6,361,288 and 6,607,366 both to Sperry disclose variable clearance volume systems for reciprocating compressors in which an unloader valve assembly (including a valve seat structure, a valve guard and multiple poppet valve members) is provided to allow selective communication between the compressor cylinder and a separate clearance volume. The opening and closing of the unloader valve assembly is controlled by manipulating a control pressure regulator connected in series with a pressure source. When the pressure in the cylinder acting on the heads of the poppet valve members exceeds the control pressure acting on the stems, the poppet valve members open, partially unloading the compressor.

The prior art Sperry variable clearance systems can pneumatically load and unload a reciprocating compressor in a smooth, stepless manner with each revolution of the crankshaft. This is accomplished by using a controlled pressure to hold the unloader poppets closed until the compressor piston reaches the desired position of its cycle. By adjusting the set point of a pressure regulator, the effective use of any shape and size of clearance cavity can be smoothly varied from having no effect to having full effect.

The Sperry variable clearance system discussed above was originally developed and used for reciprocating compressors operating generally at 200 to about 400 rpm. Subsequent improvements to the system, including those disclosed by Sanford (U.S. Pat. No. 8,070,461), have resulted in limited use of the concept on compressors up at about 900 to 1000 rpm. However, reciprocating compressors have evolved to higher and higher speeds. In particular, large reciprocating compressors used in natural gas production, gathering and pressure boosting at or near oil and gas well-heads now commonly operate at speeds of higher than 1000 rpm, most commonly at speeds of 1200 and 1400 rpm, and in many cases, at speeds of 1800 rpm or higher.

At these higher speeds, prior art systems generally encounter significant operating limitations that render them ineffective and unreliable. Specifically, response time and reliability of the poppets can limit the application of the Sperry technology at speeds above about 1000 rpm. Leakage of gas past the poppet head seats in the closed position and the poppet stem seats in the open position affects the control pressure, limiting and reducing the effective unloading of the compressor compared to the desired set point. In addition, higher operating speeds increase the impact forces and therefore the impact stresses on the poppets and seats, which can lead to failure of compressor components and reduced reliability and safety.

Reciprocating Compressor Compression Cycle—A quick explanation of a few basic thermodynamic principles is necessary to understand the science of reciprocating compressors. Referring now to FIGS. 1A-1F depicting various stages of a compressor cylinder 1 as a reciprocating piston 2 moves back and forth within it. The system also includes a suction valve 3, a discharge valve 4, and a fixed volume clearance pocket 5. The internal volume of a fixed volume clearance pocket 5 is connected to the internal cylinder volume 6 by a port 7. The port is opened or closed by a plug 8, which is connected to an actuator 9 which is manipulated manually or automatically by various means.

Compression occurs within the cylinder as a four-part cycle that occurs with each advance and retreat of the piston (two strokes per cycle). The four parts of the cycle are compression, discharge, expansion and intake. See FIG. 2, which shows the operation of the cylinder 1 of FIG. 1 graphically with pressure vs. volume plotted in what is known as a P-V diagram. Specifically, the outer, "fully loaded" pressure-volume envelope in FIG. 2 depicts the operation of the cylinder from point 1 to point 2 to point 3 to point 4 and back to point 1 with one complete revolution of the compressor crankshaft, and with port 7 closed off by plug 8 so that the added clearance pocket volume 5 is not in communication with the cylinder internal volume 6. The inner, "unloaded" pressure-volume envelope in FIG. 2 depicts the operation of the cylinder from point 1 to point A to point 3 to point B and back to point 1 with one complete revolution of the compressor crankshaft with port 7 opened, so that the added clearance pocket volume 5 is in communication with the cylinder internal volume 6.

At the conclusion of a prior cycle, the piston 2 in FIG. 1A is at the limit of its travel away from the closed end of the cylinder 1, commonly referred to as inner dead center and represented by point 1 in FIG. 2. The cylinder's internal volume 6 is filled with process gas at suction conditions (as shown in FIG. 2 at 750 psig), and the suction 3 and discharge 4 valves are closed. As the piston 2 begins to advance toward the closed end of the cylinder, the volume 6 inside the cylinder is reduced and the pressure is increased. The increased cylinder pressure causes the suction valve 3 to close and, with port 7 closed by plug 8, the internal volume 6 decreases along the pressure-volume path from point 1 to point 2. This is referred to as the "compression stroke." The pressure inside the cylinder increases until the pressure within the cylinder exceeds the discharge pressure (e.g., 1250 psig in FIG. 2) and reaches the pressure required to open the discharge valve 4.

At point 2 in FIG. 2 the increased pressure forces the discharge valve 4 open and gas flows out of the cylinder. Cylinder pressure decreases slightly for the remainder of the advancing stroke as volume continues to decrease for the discharge portion of the cycle. The cycle is now at operating point 3 in FIG. 2. The piston comes to a momentary stop at the most advanced position in its travel, as shown in FIG. 1B, which is commonly referred to as outer dead center, before reversing direction. The pressure-volume path from point 2 to point 3 in FIG. 2 is referred to as the "discharge stroke."

Note that some minimal volume remains in the cylinder in FIG. 1B, known as the clearance volume. It is the space remaining within the cylinder when the piston is at point 3, after the compressed gas is discharged from the cylinder. Some minimum clearance volume is necessary to prevent piston/head contact, and the efficient manipulation of the clearance volume is a major parameter of compressor performance.

As the piston 2 begins its return stroke away from the closed end of the cylinder as shown in FIG. 1C, the discharge valve 4 closes, the volume 6 expands and, with port 7 closed by plug 8, the pressure decreases along the path from point 3 to point 4 in FIG. 2. The pressure-volume path from point 3 to point 4 is referred to as the "expansion stroke." The gas which remained in this space re-expands to slightly below suction pressure (e.g. 750 psig in FIG. 2). Gas expansion within the cylinder is facilitated by the closing of the discharge valve 4 and the retreat of the piston 2. At point 4, the low internal cylinder pressure causes the suction valve 3 to open and fresh gas is admitted into the cylinder, as shown in FIG. 1D, until the piston 2 reaches the limit of its travel away from the closed end of the cylinder 1. The pressure-volume path from point 4 to point 1 in FIG. 2 is referred to as the "suction stroke," Once again, pressure remains relatively constant as the volume is changed. This marks the return to point 1. Comprehending this cycle is fundamental to diagnosing compressor problems, and to understanding compressor efficiency, power requirements, valve operation, etc.

Reciprocating Compressor Unloading with a Fixed Volume Clearance Pocket—The connection of a fixed volume clearance pocket is a commonly known and applied method of reducing the flow, or capacity, and the load, or power requirement, of a reciprocating compressor. This is demonstrated in FIG. 1E, FIG. 1F and FIG. 2. As shown in FIG. 1E with the plug 8 moved away from open port 7 such that the added clearance pocket volume 5 is in communication with the cylinder internal volume 6, as the piston 2 moves toward the closed end of the cylinder, the pressure is increased in both the internal cylinder volume 6 and in the pocket volume 5. Since the combined volume of 6 and 5 is larger than the internal cylinder volume 6 alone, the pressure-volume path from point 1 to point A in FIG. 2 shows that more time and more piston travel is required to compress the larger combined volume to increase the pressure to a level that is sufficient to open the discharge valve.

Similarly, as shown in FIG. 1F with the plug 8 moved away from open port 7 such that the added clearance pocket volume 5 is in communication with the cylinder internal volume 6, as the piston 2 travels away from the closed end of the cylinder, the pressure decreases in both the internal cylinder volume 6 and in the pocket volume 5. Since the combined volume of 6 and 5 is larger than the internal cylinder volume 6 alone, the pressure-volume path from point 3 to point B in FIG. 2 shows that more time and more piston travel is required to expand the larger combined volume to decrease the pressure to a level sufficient to open the suction valve 3.

As an example of how adding clearance volume affects reciprocating compressor capacity and required power, the compressor represented by the P-V diagram in FIG. 2 has a cylinder with a 7 in. diameter bore and a 6.5 in. stroke, operating at 1000 rpm to deliver gas from a 750 psig suction pressure to a 1250 psig discharge pressure. In the fully-loaded state at these operating conditions, the compressor produces a fully loaded capacity of 10.18 million standard cubic feet per day (MMCFD) and requires 289.7 horsepower (HP). Connecting a 250 in$^3$ clearance volume pocket to this cylinder, at the same operating speed and pressures, reduces the flow to 4.56 MMSCFD (44.8% of full-load capacity) and requires 118.2 HP (40.8% of rated power). Notably on a percentage basis the power is reduced more than the capacity, since the lower flow rate generates a lower pressure resistance, and therefore lower parasitic losses through the suction and the discharge valves. Accordingly, the addition of clearance volume is a preferred method of reducing the reciprocating compressor capacity and the power required for compression.

Variable Volume Clearance Pockets—As demonstrated by the foregoing discussion of FIGS. 1 and 2, the clearance volume addition can be a fixed amount that causes a significant but fixed step change in capacity and required power. When considering variable operating requirements, it is desirable to be able to change the compressor's capacity and required power in a continuously variable or "stepless" manner, so as to operate the compressor at maximum efficiency as operating conditions and flow requirements change. Since it is not practical to add a plurality of small fixed volume clearance pockets to a single cylinder in a manner that could effectively provide very small steps of clearance volume adjustment, a means of adjusting the added clearance volume in very small steps and in a continuously variable or "stepless" manner over a range is needed.

Manual means of such adjustment have been commonly applied for many decades. However, manual adjustment requires a manual intervention and effort, which is not practical for compressors that are unattended, that have frequently changing operating requirements, and/or that are expected to operate automatically and continuously with frequent and/or sudden changes in operating conditions. In fact, a large majority of all reciprocating compressors are operated unattended.

Various means of automatic clearance adjustments have been developed, for example U.S. Pat. No. 8,430,646 assigned to ACI Services, Inc., which is incorporated herein by reference in its entirety. However, such automatic means of clearance adjustment require external motive power, such as pressurized air, pressurized hydraulic fluid and/or electricity for operation, which can add significant cost and complexity to the operation. In addition, in remote applications, such as where oil and gas production operations are commonly located and which require large numbers of reciprocating compressors, electrical power is limited or non-existent. Therefore, without electrical power to drive the automatic clearance actuation directly, or to drive an air compressor or a hydraulic pump to provide pressurized air or fluid, respectively, for driving an actuator for the automatic clearance adjustment, such automatic clearance devices are not practical. In addition, the actuators or drivers for such automatic clearance adjustment means tend to be large and heavy. The only accessible location for mounting them is outboard of the cylinder, which extends its length in the direction of cylinder piston travel. The increased mass and extension of the length of the cylinder assembly amplify the normal mechanical vibration that occurs as a result of the reciprocating inertia and pressure forces acting on the compressor cylinder, and they reduce the cylinder's mechanical natural frequency, which can make it more likely to experience unsafe levels of mechanical vibration during operation.

Operation and Advantages of the Gas Operated Variable Clearance Volume Unloader for Variable Capacity Control—The present invention is intended for high-speed use (i.e. 1000 rpm and greater) in unloader valve assemblies currently employed in prior art variable clearance systems, specifically, as disclosed at columns 4-6 and in FIGS. 1-5 of U.S. Pat. No. 6,607,366 to Sperry and incorporated herein by reference, an unloader system for a reciprocating compressor. Referring to FIGS. 3 and 4 of the present disclosure, which illustrate a depiction of such a prior art unloader valve assembly 10 for a reciprocating compressor. The reciprocating compressor includes a cylinder C, a piston P reciprocally mounted in the cylinder C having a volume 14, a rotatable crankshaft connected to a piston rod R that is connected to the piston P, a suction valve assembly S, and a discharge valve assembly D for selectively communicating suction and discharge lines with the compressor cylinder. The unloader valve assembly 10 includes a valve seat structure 11, a valve guard 12, and multiple poppets 13 (a "poppet" as described herein is also referred to in the prior art as a poppet valve member, a closing element for a valve assembly, or a valve poppet) to allow selective communication between the compressor cylinder volume 14 and a separate clearance volume 15.

Opening and closing of the poppets 13 is controlled by manipulating a control pressure ($P_c$, $P_{cont}$) acting against the stem ends 18 of the poppets 13. The control pressure ($P_c$) is provided by means of a control pressure chamber 17, which is connected to a pressure source higher than the cylinder pressure ($P_{cyl}$). For example, the control pressure chamber 17 can be connected in series to a pressure control valve or pressure regulator 16, as is known in the art. The activating and deactivating of the clearance pocket volume 15 is triggered by the magnitude of the control pressure ($P_c$) in the control pressure chamber 17, which can be steplessly varied between a pressure less than the suction pressure and a pressure higher than the discharge pressure of the cylinder ($P_{cyl}$). As can be seen in FIG. 3, when the control pressure ($P_c$) in the control pressure chamber 17 is higher than the pressure ($P_{cyl}$) in the cylinder volume 14, the head ends (i.e. nearest the piston P, and also referred to as the HE) of the poppets 13 are pressed against the valve seat 11, such that ports 19 in the valve seat 11 are sealed off, preventing gas in the compressor cylinder volume 14 from communicating with the clearance pocket volume 15. However, as shown in FIG. 4, when the pressure in the cylinder volume 14 acting on the heads of the poppets 13 exceeds the control pressure 17 acting on the stems 18 of the poppets, the stem ends 18 of the poppets are pressed against the valve guard 12 causing the ports 19 in the valve seat 11 to be opened, such that the compressor cylinder volume 14 is placed in communication with the separate clearance volume 15, partially unloading the compressor system.

FIGS. 5A to 5F show the P-V diagrams of a typical prior art reciprocating compressor cylinder having a 7 in. bore diameter and a 6.5 in. stroke, operating at 1000 rpm to deliver gas from a suction pressure of 750 psig to a discharge pressure of 1250 psig. This is the same compressor and operating conditions as represented in FIG. 2. However, in the case represented in FIGS. 5A-5F, a 250 in$^3$ clearance pocket 15 is connected to the compressor cylinder volume 14 utilizing the prior art variable clearance system described above, to provide various control pressure levels acting on the stem ends 18 of the poppets 13 shown in FIG. 3 and FIG. 4. FIG. 5A shows the P-V relationship of the cylinder with the control pressure $P_c$ set at 1350 psig, which is higher than the maximum internal cylinder pressure when operating with a 1250 psig discharge pressure. At this control pressure, the opposite, head ends of the poppets 13 remain pressed against the valve seat 11 for the entire cycle, preventing communication of the cylinder volume 14 with the clearance pocket volume 15. See FIG. 3. In this "fully loaded" condition, the cylinder produces 100% of rated flow and requires 100% of rated compression power.

FIG. 5B shows the P-V diagram of this same cylinder operating at the same conditions, but with the control pressure Pc set at 1113 psig. At cylinder pressures higher than the 1113 psig control pressure, the stem ends 18 of the poppets 13 are pressed against the guard seat 12, opening the ports 19 in the valve seat 11 such that the internal cylinder volume is in communication with the clearance pocket volume, as seen in FIG. 4. When the cylinder pressure is less than the control pressure of 1113 psig the system resembles FIG. 3, with the heads of the poppets 13 pressed against the valve seat 11 closing the ports 19 in the valve seat such that the internal cylinder volume 14 does not communicate with the clearance pocket volume 15. The shape of the expansion and compression lines change when the valve seat ports 19 are open to enable the cylinder internal volume 14 to communicate with the clearance pocket volume 15. This has the effect of unloading the cylinder to reduce the flow and power to 88.3% and 82.6%, respectively (see FIG. 5B).

The control pressure Pc can be changed to any level between higher than discharge pressure, up to the maximum design pressure of the assembly, and lower than suction pressure. For illustration purposes, FIG. 5B to FIG. 5F show the P-V characteristics of the cylinder with the control pressure Pc set progressively lower, i.e. to 1113, 1000, 903, 817 and 750 psig, respectively. These control pressure settings progressively unload the cylinder to flows of 88.3%, 78.1%, 67.2%, 56.3% and 44.8%, respectively, of rated flow, with the power reduced to 82.6%, 70.5%, 60.0%, 50.5% and 40.8%, respectively, of rated power. With the control pressure Pc set at suction pressure (750 psig), as represented in FIG. 5F, the cylinder internal volume 14 is in communication with the clearance pocket volume 15 for the entire cycle. The cylinder flow and power unloading achieved with this prior art system in FIG. 5F is exactly the same as the flow and unloading for the fixed volume clearance pocket of the same volume in FIG. 2.

By comparing FIG. 5A with FIGS. 5B through 5F, which have progressively lower control pressure settings, activating the clearance volume 15 at a certain pressure in the control chamber 17 as represented in FIG. 4, it can be appreciated that the slope of the compression stroke becomes smaller when the clearance volume pocket 15 is communicating with the compressor cylinder volume 14. As a result, the discharge volume decreases. To adjust the reduced discharge volume on the expansion stroke, the clearance pocket 15 must be deactivated (i.e., no communication with the compressor cylinder volume 14) at the same pressure level, such that the slope of the expansion line becomes larger.

Accordingly, the prior art variable clearance system discussed above enables operation of the compressor cylinder in a fully loaded condition, a fully unloaded condition (dependent on the volume of the fixed clearance pocket), and at any partially unloaded condition between fully loaded and fully unloaded, as determined by the control pressure setting. This variable clearance system has several advantages over other automatic variable clearance volume systems. First, it requires only the compressed gas, supplied at a pressure slightly higher than the stage's discharge pressure, for operation. It does not require a high-voltage electrical supply, a pneumatic system, or a hydraulic system, with their attendant secondary motive power and control systems. Second, this variable clearance system is completely sealed and results in no gas emissions, venting or leakage to the atmosphere during operation. Therefore, in addition to being more environmentally compliant, the prior art Sperry variable clearance system is simpler and typically has much lower initial cost and lower operating and maintenance costs than any other automatic variable clearance system that has been conceived thus far.

Limitations of the prior art variable clearance system— The prior art variable clearance systems discussed above were developed and applied to compressors operating generally in the 200 to 400 rpm range. This is known by the present inventors who worked directly with inventor Lauren D. Sperry for years. This fact is further evidenced by the large, mushroom-head poppets that are shown in FIG. 2 of U.S. Pat. Nos. 6,361,288 and 6,607,366 to Sperry, and incorporated by reference herein in their entirety. The head diameter (item 43 in FIG. 2 of the referenced patents) is typically either 1.12 inches or 1.38 inches. Years of application and operating experience has revealed to the present inventors several limitations in these prior art variable clearance systems, and these limitations are exacerbated when used with compressors operating at speeds higher than 400 rpm.

Limitation 1. High-speed compressors are very prevalent in most gas compression applications at the current time, with rated operating speeds above 1000 rpm quite common, and speeds of 1200 to 1800 rpm most common. As the speed increases, the cycle time required is proportionally shorter for the poppet valve members (referred to herein as "poppets") to traverse the gap between the seating surfaces in the valve guard and the valve seat. In addition, the velocity, acceleration, and deceleration of the poppets are much higher at speeds above 1000 rpm than with the longer poppet opening and closing cycle times at lower speeds. The impact stress on the poppet seating face, which is generally the surface undergoing the highest stress in the poppet (see FIGS. 6A/B), is proportional to the poppet mass and to the square of the impact velocity. High impact velocity and the resulting high stresses on the poppet seating faces typically lead to premature failures of the poppets, and therefore, of the unloading system. FIG. 6A illustrates an example of 0.500 in. diameter poppets 13 from a prior art variable clearance system and two failed poppets 21. The head ends of the failed poppets 21 become cracked, worn out, distorted, or otherwise broken within about two hours of testing on a reciprocating compressor operating at 1200 rpm with a control pressure of 1232 psig, a compressor cylinder suction pressure of 835 psig and a discharge pressure of 1345 psig. The accompanying stress map in FIG. 6B is from a finite element stress analysis of the poppets, which were made of molded PEEK (polyether ether ketone) material. At test conditions, the analysis shows that the impact stress at the poppet head seating surface is 25,700 psi, which is 177% of the poppet material fatigue strength. This analysis predicts that the poppets will have a noticeably short service life when used at such high (greater than 1000 rpm) operating speeds.

The impact stresses can be reduced by using smaller, lighter weight poppets, which has become a common practice, as represented by the 0.500 in. diameter cylindrical poppets compared with Sperry's original 1.12 or 1.38 in. diameter mushroom-head poppets. Nevertheless, it is notable that the impact stress on poppets of any specific size and mass operating at 1000 rpm is more than 6.25 times the impact stress on the same poppets operating at 400 rpm, and, when operating at 1800 rpm, the impact stress will be 20.25 times the impact stress at 400 rpm. As a result, size and mass reduction of poppet proportions to limit the impact stresses to acceptable levels is generally not practical for high-speed compressors.

In light of the above discussion it can be appreciated that compressor speed (i.e. speeds of 1000 rpm and higher) is a significant limiting factor in the application of prior art variable clearance systems. Improvements are therefore necessary and desirable to make such prior art systems applicable to high-speed compressors.

Limitation 2. FIG. 5A through FIG. 5F, which have been previously described above, illustrate theoretical P-V diagrams for prior art (e.g. Sperry) variable clearance volume systems. FIG. 7 shows an actual P-V diagram from a compressor operating with such a prior art system. Notably, there is a delay evident in the compression stroke, caused when the head ends of the poppets 13 (see FIGS. 3 and 4) do not move off of the valve seat 11 until the cylinder pressure is higher than the control pressure setting. This delays the communication time of the clearance pocket volume 15 with the cylinder volume 14 and results in a shorter time of communication.

Similarly, there is a delay evident in the expansion stroke, caused when the stem ends 18 of the poppets 13 do not move off of the guard seat 12 until a cylinder pressure is reached that is lower than the control pressure setting. This extends the communication time of the pocket volume 15 with the cylinder volume 14 and results in a longer time of communication. These delays change the intended effectiveness of the clearance pocket volume in unloading the compressor. If the delays are small, the effect can be limited by setting the control pressure intentionally at a different pressure, which can somewhat compensate for the defect. Nevertheless, for reliable and predictable application of the system, and to avoid damage to the poppets at high operating speeds, it is necessary to minimize, if not completely eliminate, such delays.

It is believed by the present inventors that the cause for the delay in opening and closing the poppets between the cylinder volume and the clearance pocket volume is caused by the contact, or sealing, area between the poppets and their stationary seats when the poppets are held in contact with the seats. Referring to FIG. 8, the sealing of a poppet 13 to its stationary seat 20, either in the valve seat or the valve guard, is accomplished, in this case, by the mating of two conical surfaces, wherein the angle 25 of the conical surface 23 of the poppet 13 is slightly steeper than the angle 26 of the conical surface 22 of the stationary seat 20, such that a narrow circular contact line 24 occurs where surfaces 22 and 23 meet.

Referring now to FIG. 9, the sealing of a poppet 13 having a circular surface 32 to its stationary seat 20, either in the valve seat or the valve guard, can also be accomplished by the mating of the circular surface 32 with a conical stationary seat surface 22 so that a narrow circular contact line 24 occurs where surfaces 22 and 32 meet. Essentially perfect radial alignment between the two mating surfaces is required for complete sealing without leakage.

Additionally, in practice, due to deformation and surface wear, the narrow circular contact line 24 has a certain contact width 40 (and 41) as shown in FIGS. 11A and 11B. This results in a small annular area on the poppet surface in which no pressure acts when the poppet is in contact with its stationary seat. During part of the compression cycle, as shown in FIG. 11A, the control pressure ($P_{cont}$) 46 acts on the stem end 43 of the poppet and on the head end 42 of the poppet up to the outer edge of the sealing area ($A_2$) 44, while cylinder pressure ($P_{cyl}$) 47 acts on the head end 42 of the poppet out to the inner edge of the sealing area ($A_1$) 45. Also referencing FIG. 3, since area ($A_2$) 44 is slightly larger than area ($A_1$) 45, the cylinder pressure ($P_{cyl}$) 47 must be higher than the control pressure ($P_{cont}$) 46 before the poppet 13 will move off the valve seat 11 to open communication of the cylinder volume 14 with the clearance pocket volume 15; i.e., the head end 42 of the poppet 13 moves off the valve seat 11 when $P_{cyl} > P_{cont} \times A_2/A_1$.

During a different part of the compression cycle, as shown in FIG. 11B, the cylinder pressure ($P_{cyl}$) 47 acts on the head end 42 of the poppet and on the stem end 43 up to the outer edge of the sealing area ($A_4$) 48, while the control pressure ($P_{cont}$) 46 acts on the stem end 43 of the poppet out to the inner edge of the sealing area ($A_3$) 49. Also referencing FIG. 4, since ($A_4$) 48 is slightly larger than ($A_3$) 49, the cylinder pressure ($P_{cyl}$) 47 must be less than the control pressure ($P_{cont}$) 46 before the poppet will move off the guard seat 12 to stop communication of the cylinder volume 14 with the clearance pocket volume 15; i.e., the stem end 43 of the poppet moves off the guard seat 12 when $P_{cyl} < P_{cont} \times A_3/A_4$.

FIG. 12 illustrates this effect for poppets having an inner circular sealing diameter ranging from 0.360 in, to 0.485 in., and with an annular sealing width (40 or 41 in FIGS. 11A/B) of 0.003 in. For reference, the inner circular sealing diameter is the diameter corresponding to areas ($A_1$) 45 and ($A_3$) 49 in FIGS. 11A/B. In FIG. 12, the differential between cylinder pressure and control pressure is plotted vs. control pressure. For the compression stroke, the differential is positive (i.e., cylinder pressure>control pressure) and for the expansion stroke, the differential is negative (i.e., cylinder pressure<control pressure). FIG. 12 shows that, for a specific sealing width, a larger inner circular sealing diameter reduces the differential pressure.

FIG. 13 illustrates the influence of the width of the annular sealing area (40 or 41 in FIGS. 11A/B) for a poppet having an inner circular sealing diameter of 0.410 in. These calculations illustrate the importance of a very narrow circular or annular area of contact and the avoidance of designs or operating conditions that result in significant wear that would widen the contact area. FIG. 13 shows that, for a specific inner circular sealing diameter, a smaller sealing width reduces the differential pressure. In light of this, it becomes apparent that basic design factors and rules are desirable in order to limit or minimize the differential between cylinder pressure and control pressure; such designs could be used to mitigate and minimize the limitations of prior art (e.g. Sperry) variable clearance systems.

Limitation 3. Referring back to FIG. 8, which shows sealing of a poppet 13 to its stationary seat 20 by the mating of two conical surfaces, perfect radial alignment is required between the conical sealing face 23 of the poppet and the conical surface 22 of the stationary seat, such that the centerline 30 of the poppet and the centerline 29 of the stationary seat must be perfectly aligned, resulting in a complete circular contact line 24 between the two conical surfaces. When there is a radial misalignment of the centerline 30 of the poppet and the centerline 29 of the stationary seat, as seen in FIG. 10, contact of the poppet sealing face 23 with the seat surface 22 is imperfect, with contact only made at one point 33. A gap 31 occurs at other points around the sealing periphery. Although the poppet axis or centerline 30 may be tilted to seek better alignment of the sealing face with the seat, the sealing will nevertheless be imperfect, such that there will be some leakage of gas past the sealing face while the poppet is in contact with the seat. This situation occurs on the head end of the poppet contacting the valve seat, and also on the stem end of the poppet contacting the guard seat. It also occurs when the poppet has a circular sealing face of the type shown in FIG. 9.

The gas control pressure ($P_c$, $P_{cont}$) is higher than the cylinder pressure ($P_{cyl}$) when the head ends of the poppets 13 are held against the valve seats 11 by the control pressure (i.e., so that the clearance pocket volume 15 does not communicate with the cylinder volume 14 (see FIG. 3). Thus, if a poppet head does not seal perfectly with its valve seat, gas leaks from the control pressure chamber into the compressor cylinder. This leakage decreases the control pressure unless it can be rapidly, i.e. immediately in real time, maintained by the control valve/pressure regulator 16. Such a decrease in the control pressure causes the head ends of the poppets to move away from the valve seat 11 earlier than intended during the compression stroke, causing the cylinder volume 14 to communicate with the clearance pocket volume 15 sooner, and for a longer time than intended.

As FIG. 4 illustrates, the cylinder pressure is higher than the gas control pressure when the stem ends 18 of the poppets 13 are held against the guard seats 12 by the cylinder pressure (i.e., so that the cylinder volume 14 communicates with the clearance pocket volume 15). Thus, if a poppet stem 18 does not seal perfectly with the guard seat 12, cylinder pressure can leak into the control pressure chamber. This leakage increases the control pressure unless it can be rapidly (i.e., immediately in real time) maintained by the control valve/pressure regulator 16. Such an increase in the control pressure during the expansion stroke causes the stem ends 18 of the poppets to move away from the guard seat 12 sooner than intended, and the opposite, head ends of the poppets 13 to contact the valve seat 11 sooner than intended, terminating the communication of the clearance pocket volume 15 with the cylinder volume 14 earlier than intended.

In both cases of leakage described above, since the control pressure is different than the intended setting, the control of the unloader is negatively affected, making its performance less predictable, more erratic and, therefore, unreliable. In addition, the early termination of communication of the cylinder volume 14 with the clearance pocket volume 15 during the expansion stroke means that the compressor is unloaded less than intended. The amount of leakage is influenced by misalignment of the poppet ends with their respective seats, the magnitude of the pressure difference between the cylinder pressure and the control pressure, and by the speed of the compressor (i.e. higher rpm's or a faster compressor speed makes it more difficult for the control valve/regulator 16 to maintain the control pressure in the event of such leakage).

Since the time for leakage increases as the control pressure is decreased (for more unloading), the effect of leakage on the control pressure increases at lower control pressures. If the control pressure cannot be instantaneously and continuously maintained at the intended setting by the control valve/regulator 16, then it cannot be set as low as intended. This reduces the effectiveness of the unloading, and limits the maximum unloading potential of the system. Although increasing the volume and line sizes of the control pressure chamber 17 and the connected system is one way of partially mitigating the effects of poppet leakage, such leakage reduces the overall compression efficiency and increases the operating temperature of the unloader. This phenomenon is time dependent, meaning that the required response time of the control system pressure for a high-speed compressor is much shorter than the required response time for a slow-speed compressor. Therefore, as compressor speed increases, poppet leakage requires that the control pressure regulating system must react increasingly faster in order to maintain the control pressure appropriately close to the intended setting. This becomes increasingly impractical as compressor speeds increase, becoming marginally practical at a compressor speed of about 500 rpm, unreliable at a compressor speed of about 750 rpm, and essentially impractical at a compressor speed of about 1000 rpm or higher.

A further consideration is that high-speed compressors generally have shorter strokes and, therefore, smaller cylinder swept volumes than slow-speed compressors producing the same capacity. Therefore, the effect of communication with a clearance volume of a specific magnitude is more pronounced for a high-speed compressor than for a slower-speed compressor having a larger cylinder swept volume. Thus, deviations between the actual and the intended control pressure on high-speed compressors causes larger errors between the actual unloading and the intended unloading that occurs. This is a further limitation in the application and use of the prior art Sperry variable clearance system with high-speed compressors. Therefore, minimization, and ideally elimination, of poppet leakage is a necessary requirement of any improvement of these systems for use with high-speed compressors.

The fundamental cause of leakage is misalignment between the poppets and the seats. So, when alignment is not perfect, there will be incomplete sealing, and therefore leakage between the surfaces of the poppet seats and the mating stationary seats. U.S. Pat. No. 8,070,461 to Sanford noted this fact, and proposed the use of poppet sealing rings as a means of reducing the leakage caused by the misalignment between poppets and seats. However, the sealing rings are very small, requiring high precision and special tooling that adds manufacturing complexity and cost. And the requirement for ring grooves in the outer diameter of the poppets results in higher stresses in the barrel or wall of the poppets, due to stress concentration and thinner wall section. Generally, for high-speed compressors, it is necessary to use a poppet design that is hollow, closed off on only one end, to minimize the mass of the poppet. The ring grooves provided by Sanford limit the amount of material that can be removed from the center of the poppet. These factors can limit the application range, strength, and the reliability of the poppets when operating at high speeds. Accordingly, other means are necessary and desirable for reducing or eliminating leakage between the poppets and the stationary seats.

In light of the discussion above, it is apparent that it would be useful to provide improvements to prior art unloader systems for application with modern large, high-speed reciprocating compressors, and specifically for reducing or eliminating poppet damage and failure, as well as for reducing or eliminating gas leakage between the poppets and the stationary seats.

SUMMARY OF THE INVENTION

Accordingly, the present invention provides significant improvements to known unloader valve assemblies to enable effective, efficient, and reliable application and use with current high-speed reciprocating compressors. Specific poppet and seat design criteria are defined, as well as specific poppets, poppet seals, cushioning seat plates, and flow area criteria which can significantly reduce poppet leakage, reduce the control pressure offset, and reduce the high impact stresses associated with use on modern high-speed reciprocating compressors.

A first aspect of the invention provides an unloader valve assembly for a reciprocating compressor, comprising: (a) a clearance pocket having a fixed volume; (b) a support dome including a plurality of support dome ports, wherein each of the plurality of support dome ports communicates with the clearance pocket; (c) a valve guard including: (i) a plurality of poppet guide recesses; (ii) a plurality of poppets, wherein each of the plurality of recesses houses one of the plurality of poppets, each of the plurality of poppets having an upper sealing surface and a lower sealing surface; (iii) a plurality of valve guard seating surfaces for contacting the upper sealing surfaces of the plurality of poppets, wherein each of the plurality of valve guard seating surfaces contacts an upper sealing surface of one of the plurality of poppets; (iv) a spacer plate portion comprising a plurality of posts for supporting the valve guard against the support dome, wherein the spacer plate and the support dome form a control pressure chamber, wherein each of the plurality of posts include a central port which communicates with one of the plurality of support dome ports; (v) a plurality of control pressure ports, each of the plurality of control pressure ports located in the spacer plate portion between the plurality of posts, wherein each of the plurality of control pressure ports communicates with the control pressure chamber and with one of the plurality of poppet guide recesses; (d) a valve seat including: (i) a valve seat cushioning plate for reducing the magnitude of impact stresses acting on the head end of the poppet, the valve seat cushioning plate including a plurality of valve seat seating surfaces for contacting the lower sealing surfaces of the plurality of poppets, wherein each of the plurality of valve seat seating surfaces contacts a lower sealing surface of one of the plurality of poppets; and (ii) a plurality of valve seat ports, wherein each of the plurality of valve seat ports communicates with a cylinder of a reciprocating compressor.

A second aspect of the invention provides a control chamber spacer plate for use with a valve assembly of a reciprocating compressor unloader, the spacer plate comprising: a plurality of posts for supporting the spacer plate against a valve support dome of a valve assembly of a reciprocating compressor unloader to create a volume between the spacer plate and the valve support dome, wherein the volume between the spacer plate and the valve support dome forms a control pressure chamber within the unloader, wherein each of the plurality of posts include a central port which communicates with one of a plurality of ports in the valve support dome, and wherein each of the plurality of ports in the valve support dome communicates with a clearance pocket volume of the unloader; and a plurality of control pressure ports, each of the plurality of control pressure ports located in the spacer plate between the plurality of posts, wherein each of the plurality of control pressure ports communicates with the control pressure chamber.

A third aspect of the invention provides a pressure breaker poppet for use with an unloader valve assembly of a reciprocating compressor, the pressure breaker poppet comprising: a head end having a first diameter, the head end including: an upper sealing surface for contacting a seating surface of a valve guard of an unloader valve assembly of a reciprocating compressor, wherein the valve guard includes a control pressure port connected to a clearance pocket of the unloader valve assembly; and a lower sealing surface for contacting a seating surface of a valve seat of the unloader valve assembly, wherein the valve seat includes a valve seat port connected to a cylinder volume of the compressor; a stem end having a second diameter which is smaller than the first diameter of the head end, the stem end including a plurality of steps radially protruding from the second diameter; and a sealing guide stem having a third diameter which is smaller than the second diameter of the stem end, wherein the sealing guide stem is sized to fit within the control pressure port in the valve guard.

A fourth aspect of the invention provides a pressure breaker poppet for use with an unloader valve assembly of a reciprocating compressor, the pressure breaker poppet comprising: a head end having a first diameter, the head end including: an upper sealing surface for contacting a seating surface of a valve guard of an unloader valve assembly of a reciprocating compressor, wherein the valve guard includes a control pressure port connected to a clearance pocket of the unloader valve assembly; and a lower sealing surface for contacting a seating surface of a valve seat of the unloader valve assembly, wherein the valve seat includes a valve seat port connected to a cylinder volume of the compressor; and a stem end having a second diameter which is smaller than the first diameter of the head end, the stem end including a plurality of steps radially protruding from the second diameter.

A fifth aspect of the invention provides an impact tolerant self-sealing poppet for use with an unloader valve assembly of a reciprocating compressor, the impact tolerant self-sealing poppet comprising: a head end having an outer diameter, the head end including a plurality of steps radially protruding from the outer diameter of the head end and a lower sealing surface for contacting a seating surface of a valve seat of an unloader valve assembly of a reciprocating compressor; and a stem end having an outer diameter that is substantially the same as the outer diameter of the head end, the stem end including a plurality of steps radially protruding from the outer diameter of the stem end and an upper sealing surface for contacting a seating surface of a valve guard of the unloader valve assembly.

A sixth aspect of the invention provides an impact tolerant self-sealing floating seat poppet for use with an unloader valve assembly of a reciprocating compressor, the impact tolerant self-sealing floating seat poppet comprising: a head end having an outer diameter, the head end comprising a head end piece including a central hollow portion having an inner diameter, and a lower sealing surface for contacting a seating surface of a valve seat of an unloader valve assembly of a reciprocating compressor; a stem end having an outer diameter that is substantially the same as the outer diameter of the head end, the stem end comprising a stem end piece including a central hollow portion having an inner diameter that is substantially the same as the inner diameter of the head end piece, and an upper sealing surface for contacting a seating surface of a valve guard of the unloader valve assembly; a central core positioned between the head end piece and the stem end piece, the central core comprising a hollow portion, a plurality of steps radially protruding from the outer diameter of the central core, and bulbous-shaped ends for connecting to the head end piece and the stem end piece, wherein the bulbous-shaped ends have a larger outer diameter than the inner diameters of the head end piece and the stem end piece.

A seventh aspect of the invention provides a diaphragm seal poppet for use with an unloader valve assembly of a reciprocating compressor, the diaphragm seal poppet comprising: a head end having an outer diameter and including a lower sealing surface for contacting a seating surface of a valve seat of an unloader valve assembly of a reciprocating compressor; a stem end having an outer diameter that is substantially the same as the outer diameter of the head end; and a flexible diaphragm seal projecting from the stem end, the diaphragm seal comprising: a bulbous outer diameter clamped into a recess of a valve guard of the unloader valve assembly; a seating recess for contacting a seating surface of the valve guard; and at least one strain relief loop positioned between the bulbous outer diameter and the seating recess.

The nature and advantages of the present invention will be more fully appreciated from the following drawings, detailed description, and claims.

BRIEF DESCRIPTION OF THE DRAWINGS

The accompanying drawings illustrate embodiments of the invention and, together with a general description of the invention given above, and the detailed description given below, serve to explain the principals of the invention.

DETAILED DESCRIPTION OF THE INVENTION

Figure 1B:
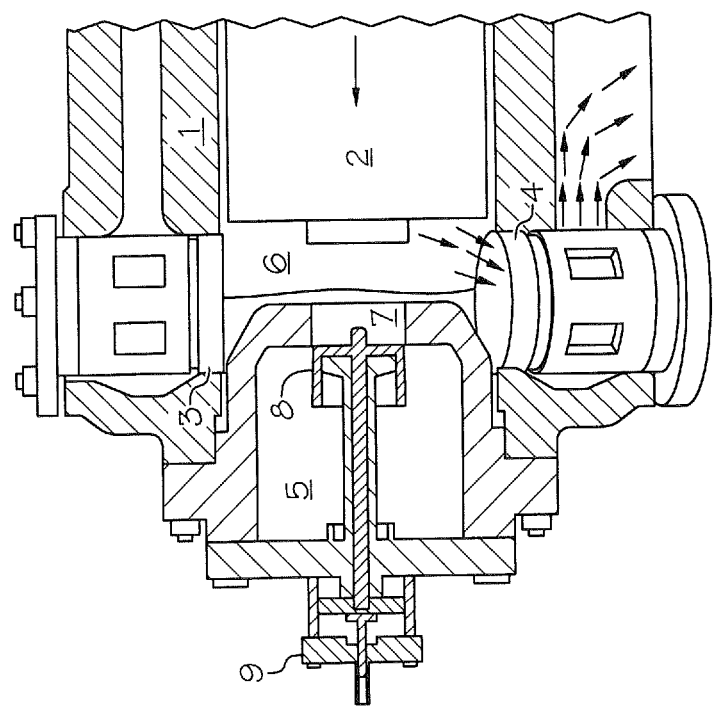
FIGS. 1A-1F illustrate the steps of the processes inside a reciprocating compressor cylinder without (FIGS. 1A-1D) and with (FIGS. 1E-1F) a fixed clearance volume communicating with the volume inside the compressor cylinder.
Figure 1A:
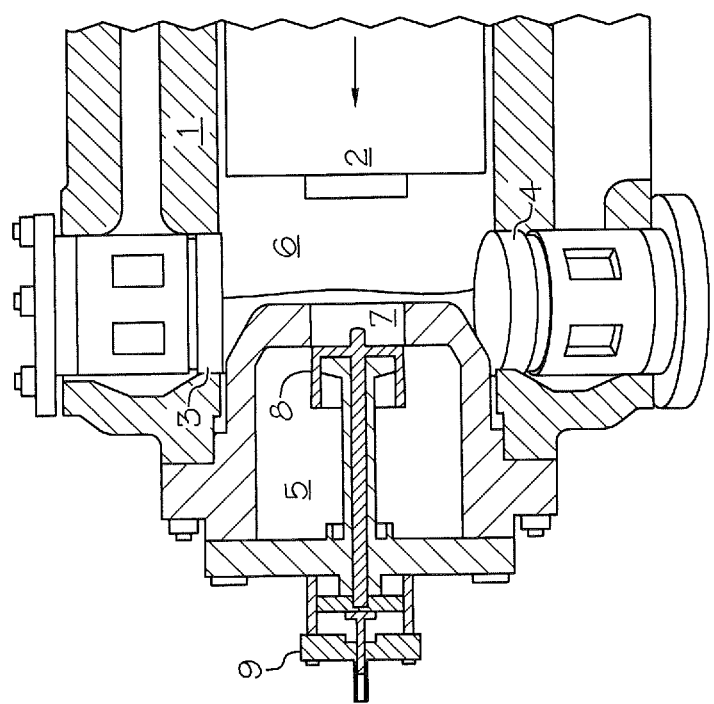
Figure 1C:
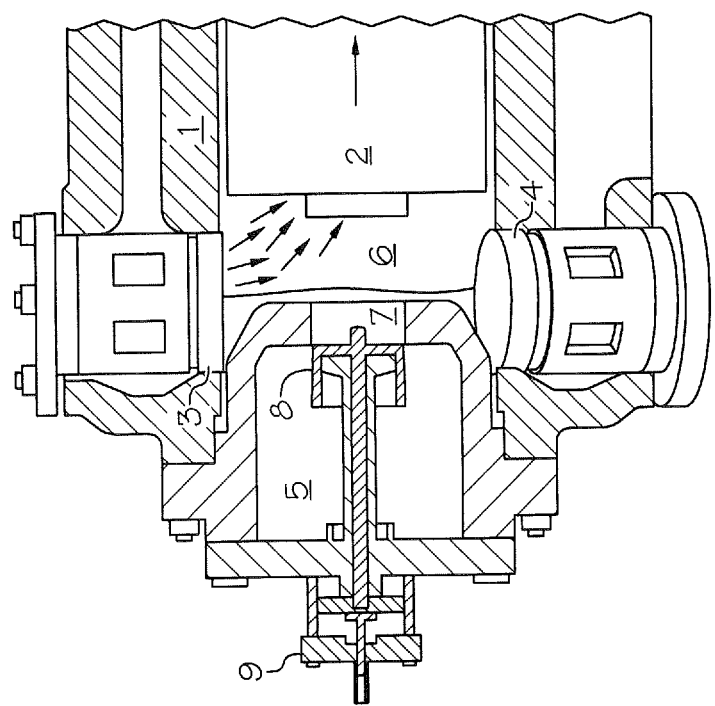
Figure 1D:
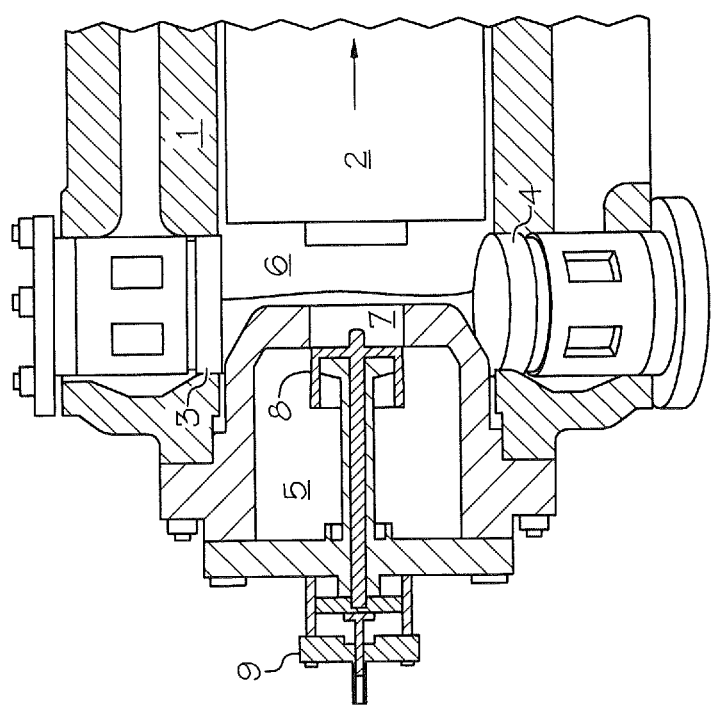
Figure 1F:
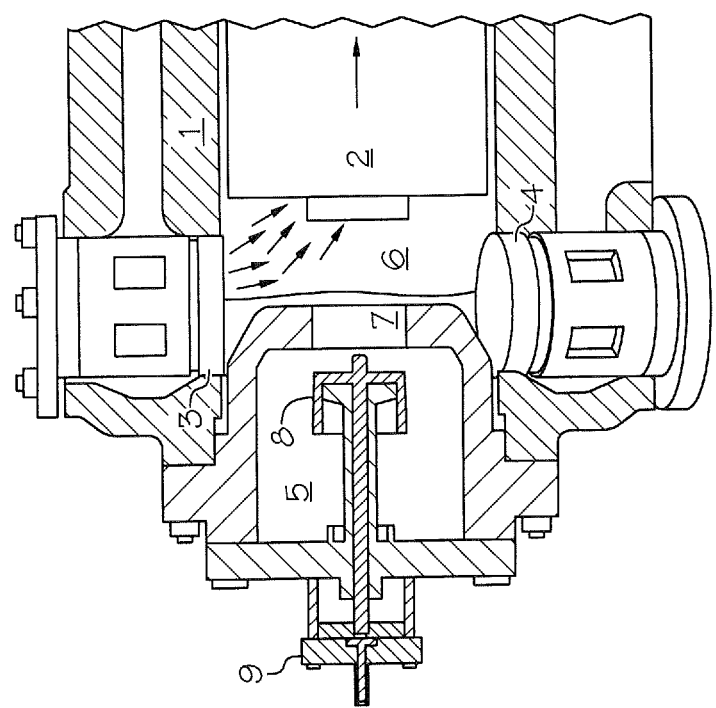
Figure 1E:
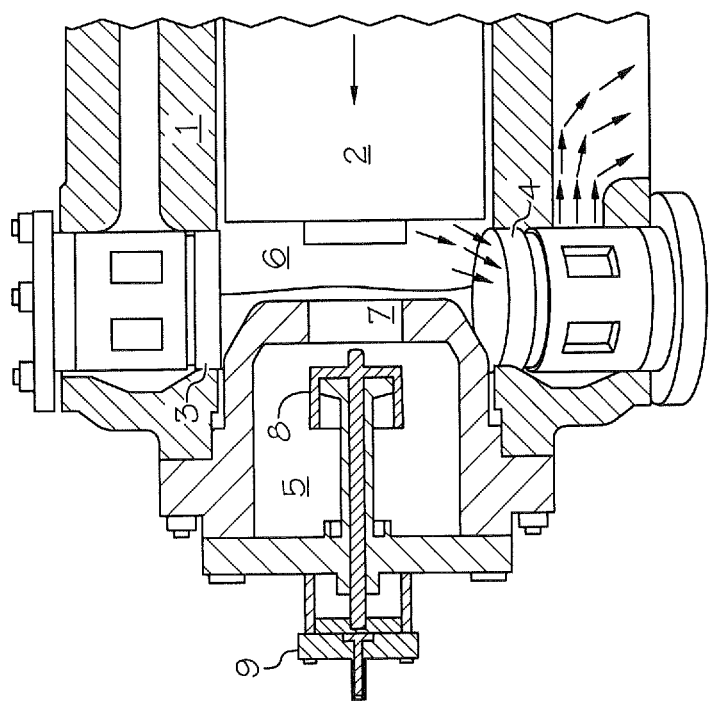
Figure 2:
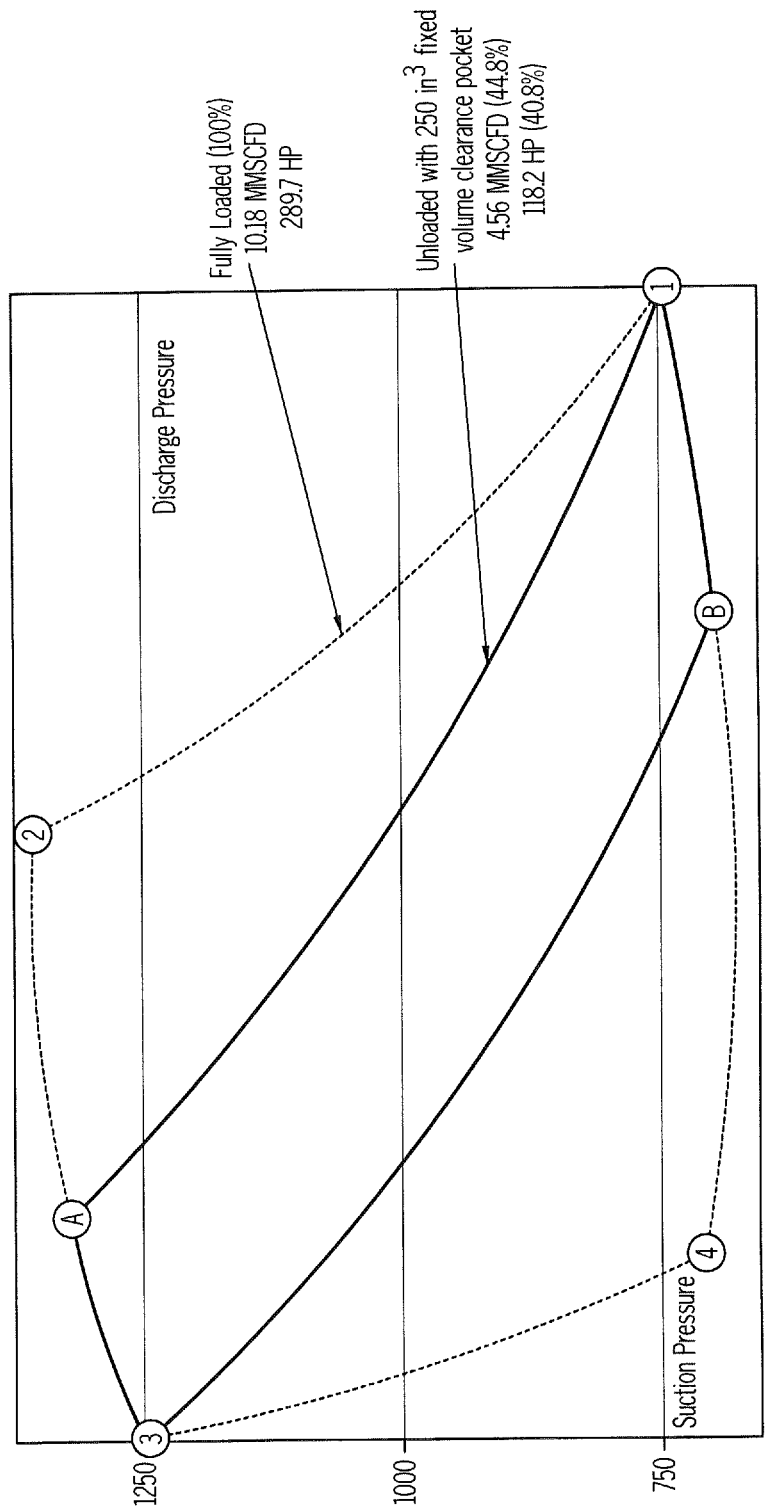
FIG. 2 illustrates a theoretical pressure-volume diagram for a reciprocating compressor cylinder with and without a fixed clearance volume communicating with the volume inside the compressor cylinder.
Figure 3:
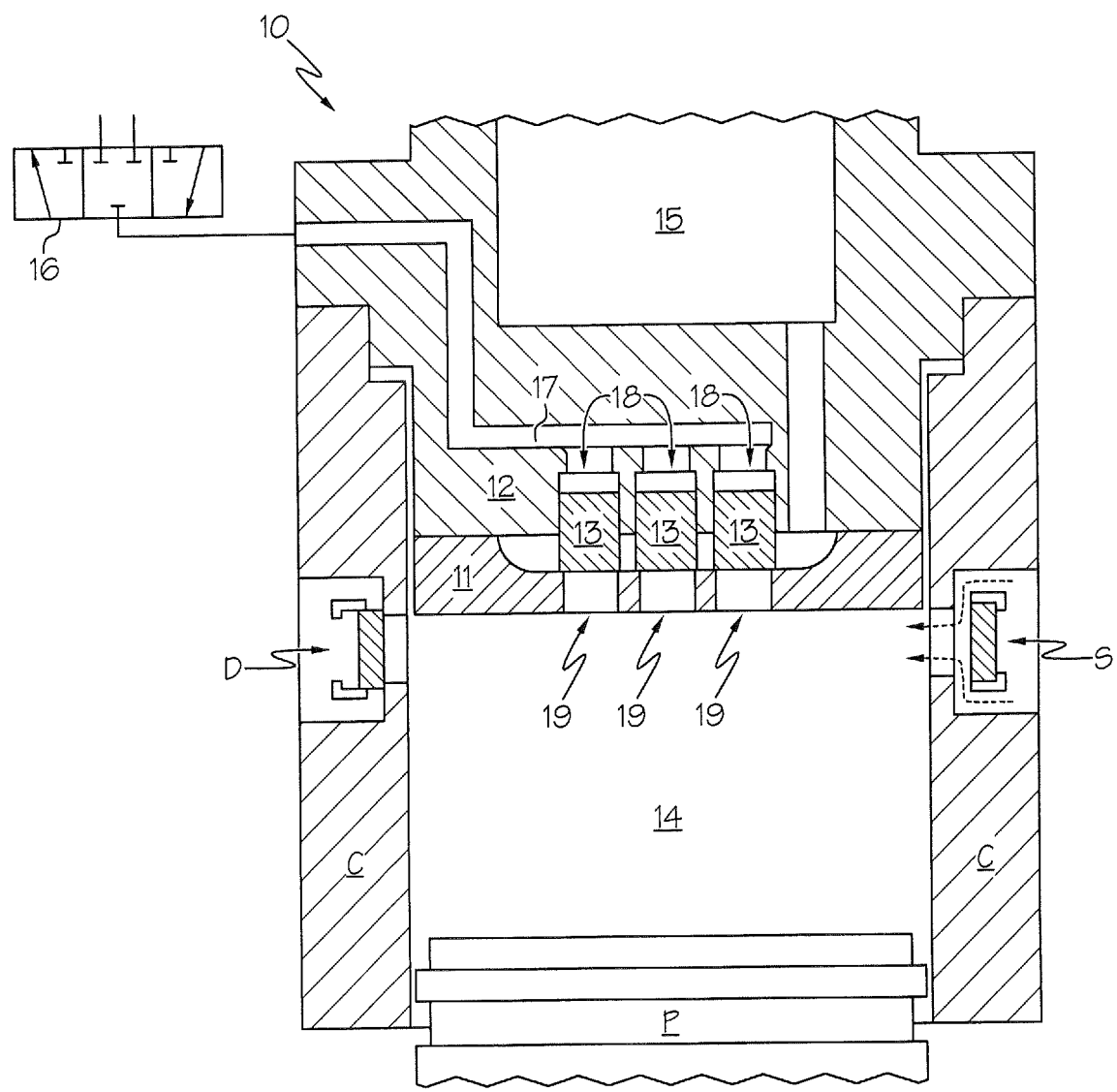
FIG. 3 illustrates a cross-section of a prior art (i.e. Sperry) variable clearance system with the system inactive, such that the fixed clearance volume does not communicate with the volume inside the compressor cylinder.
Figure 4:
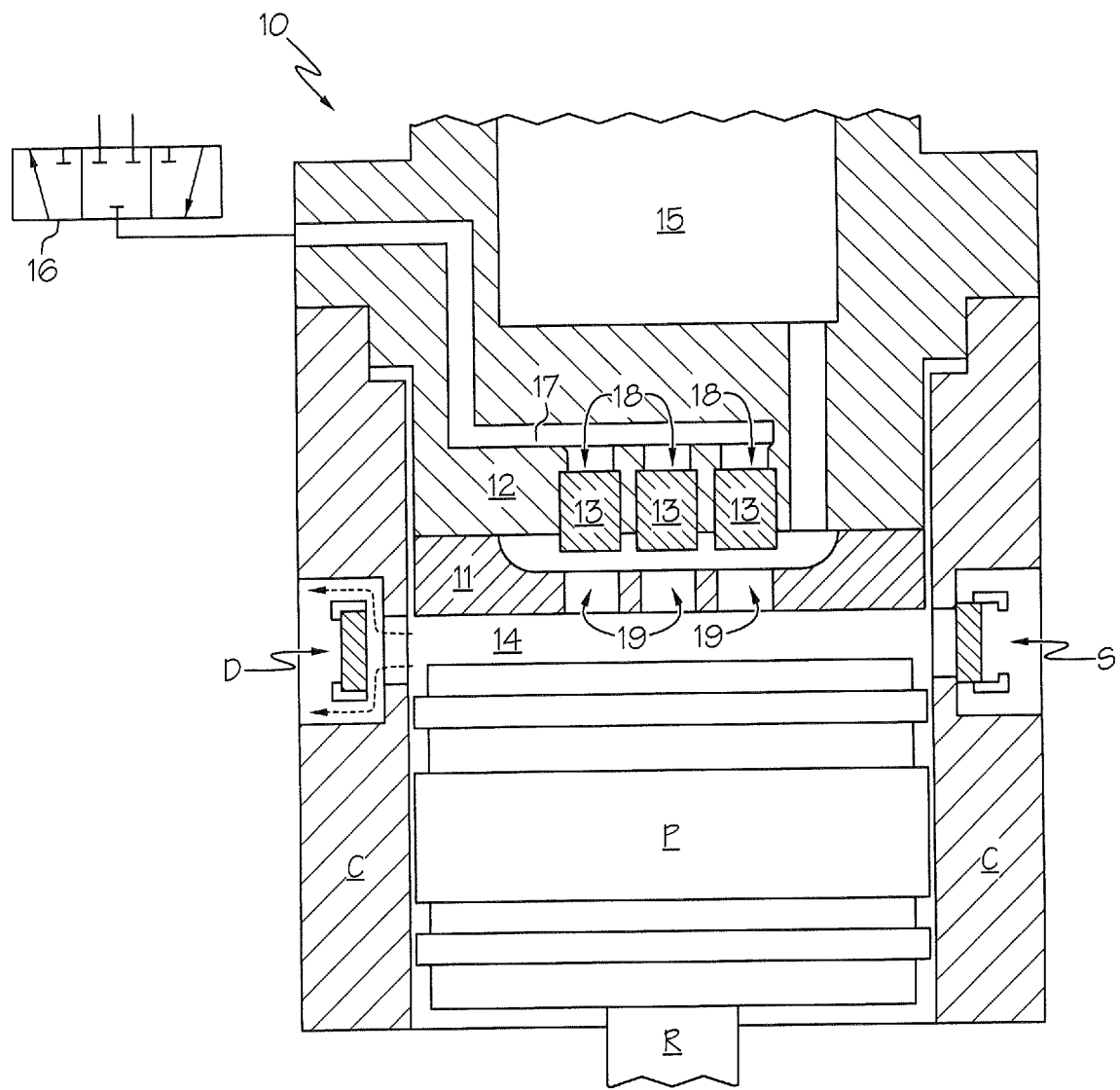
FIG. 4 illustrates a cross-section of the Sperry variable clearance system with the system active, such that the fixed clearance volume communicates with the volume inside the compressor cylinder.
Figure 5A:
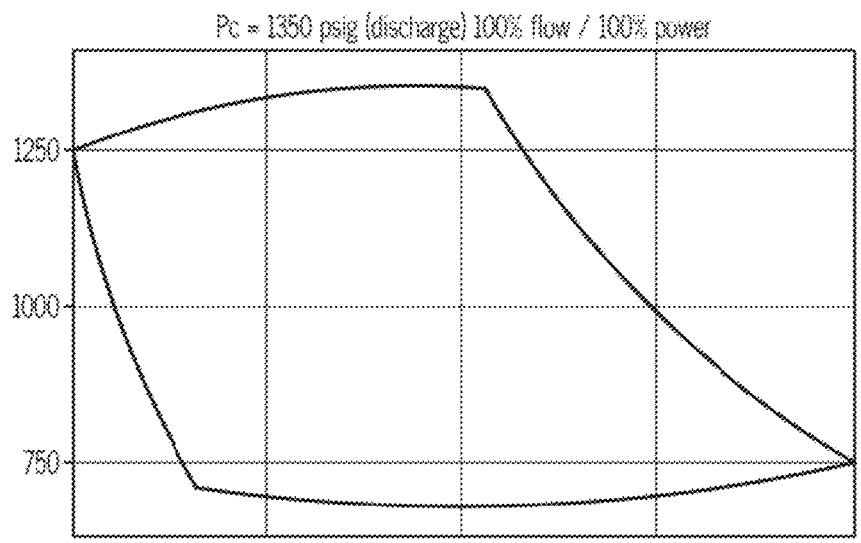
FIGS. 5A-5F illustrate a representation of theoretical pressure-volume diagrams showing the effect of the Sperry variable clearance system to provide several increments of unloading, ranging from no unloading to maximum unloading for a specific example.
Figure 5B:
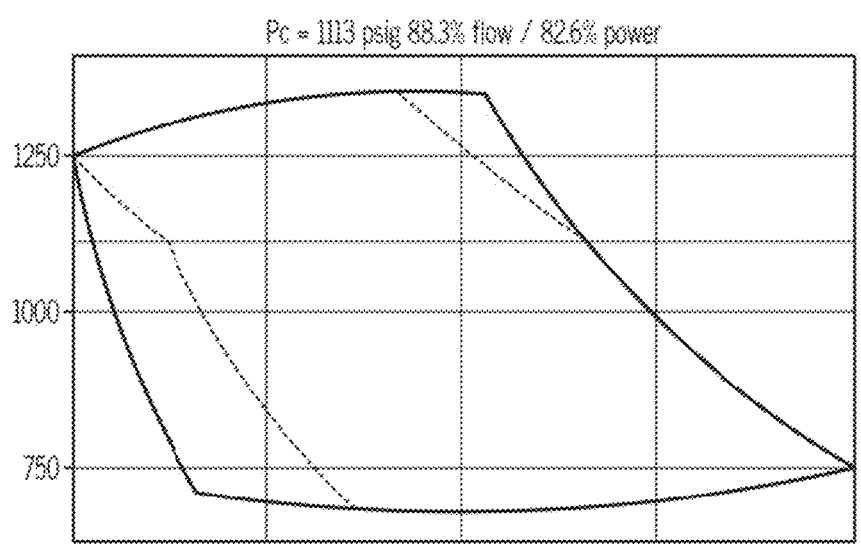
Figure 5C:
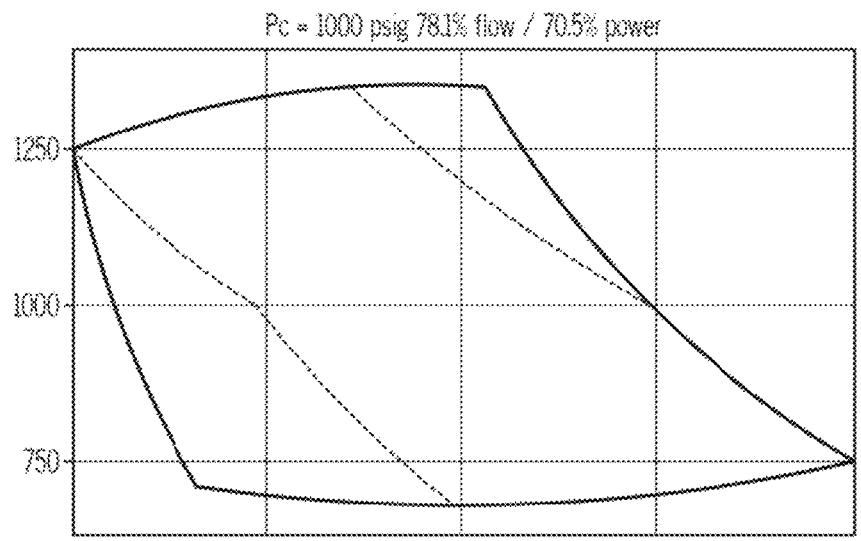
Figure 5D:
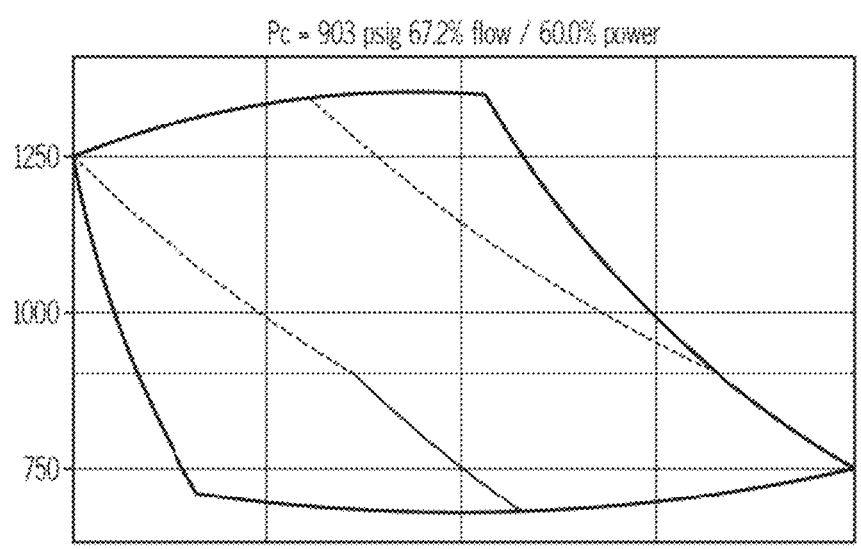
Figure 5E:
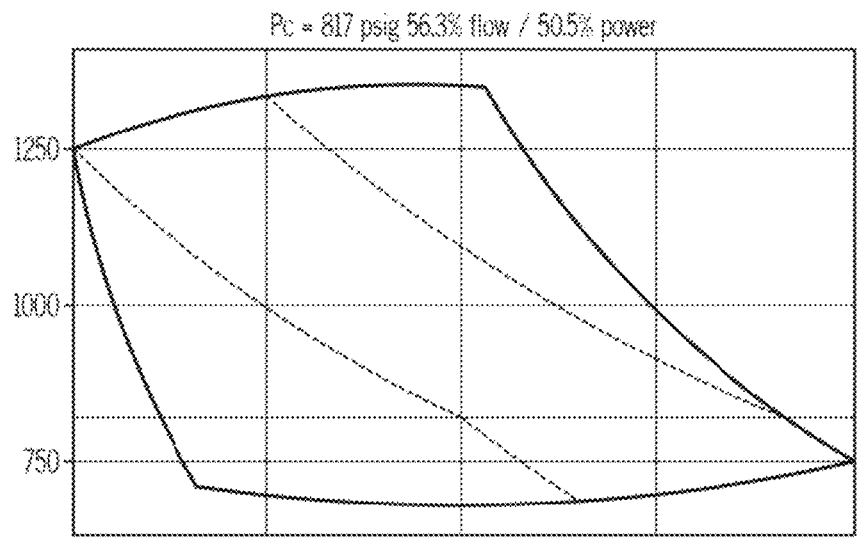
Figure 5F:
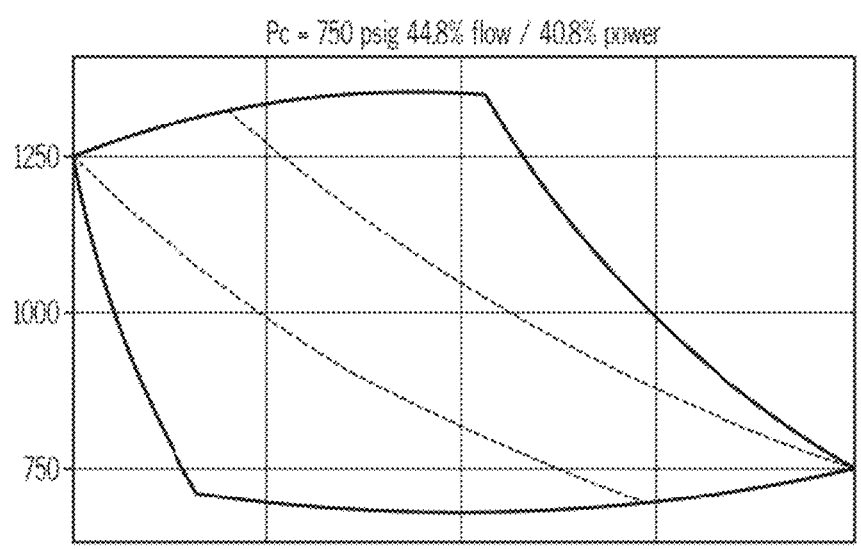

The present invention provides improvements to prior art unloader valve assemblies for use with reciprocating compressors to allow selective communication between the compressor cylinder and a clearance pocket, as detailed above. The invention can provide improved communication between the compressor cylinder and the clearance pocket, and discloses specific poppet and valve seat design criteria, flow area criteria, poppet seals, and cushioning seat plates that can reduce or eliminate poppet leakage, the control pressure offset, and the high impact stresses on the poppets that are associated with operating prior art unloader systems at high operating speeds. The embodiments disclosed herein provide an effective, efficient, and reliable solution for application of prior art unloader systems at compressor speeds of 1000 rpm or higher.

Poppet Seat Design Requirements—Novel poppets (and mating valve seats) are disclosed herein, which are useful for maximizing unloader efficiency and achieving acceptable poppet service life. The poppet designs (also referred to in the prior art as a poppet valve member, a closing element, or a valve poppet) disclosed herein are a result of the optimization of several desirable geometric features, for example, the poppet's mass (and therefore its physical size) must be sufficiently small so as to limit the impact stresses on the poppet and valve seat faces at compressor speeds higher than 1000 rpm and up to 1800 rpm. The diameter of the port that is sealed by the poppet must be sufficiently large so as to minimize pressure losses as gas flows rapidly between the compressor cylinder volume and the clearance pocket volume during each stroke of the compressor piston. The diameter of the narrow circular contact line between the poppet sealing face and its stationary valve seat must be sufficiently large as practical, and the annular width of the circular contact line must be sufficiently narrow as practical to minimize the differential pressure required between cylinder pressure and control pressure for opening and closing the poppets. The diameter and the width of the circular contact line must be sufficiently large so as to limit the impact stress on the poppet seat face when the poppet closes rapidly against the mating face in the stationary valve seat. The inner diameter of the circular contact line must be sufficiently larger than the port diameter to ensure that the circular contact line does not overlap the port and cause leakage. The outer diameter of the circular contact line must be sufficiently smaller than the poppet outside diameter to limit the corner stress caused by the poppet closing against the stationary seat. The poppet lift (travel distance between the seat and the guard within the valve assembly) must be sufficiently large so as to minimize pressure losses as gas flows rapidly back and forth between the compressor cylinder volume and the clearance pocket volume, but the lift must also be sufficiently small so as to the limit the impact stresses on the valve seat faces at speeds higher than 1000 rpm and up to 1800 rpm.

Figure 8:
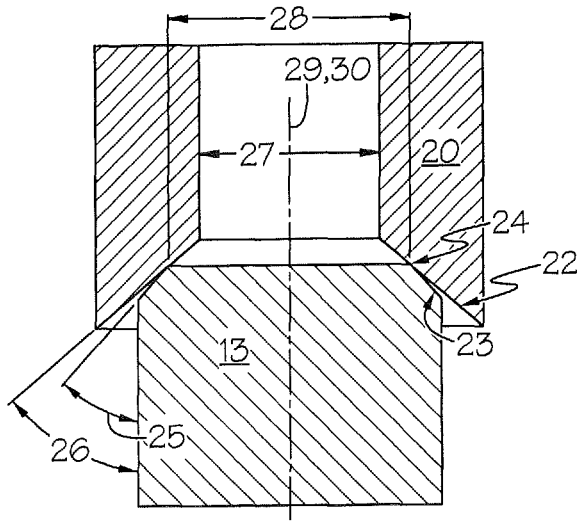
FIG. 8 illustrates a conical poppet seating surface engaging a conical stationary valve seat.
Figure 9:
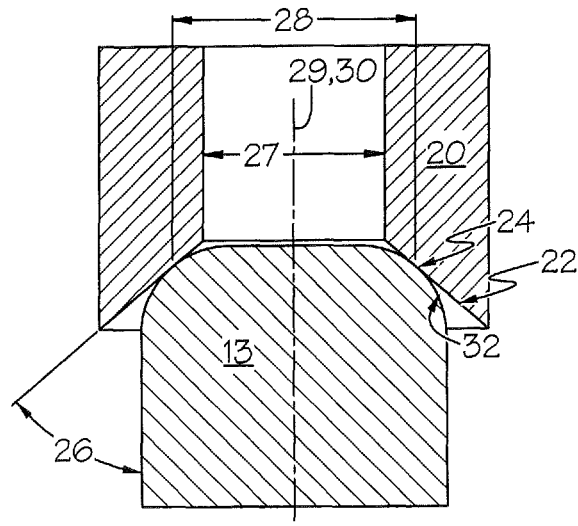
FIG. 9 illustrates a circular poppet seating surface engaging a conical stationary valve seat.
Figure 10:
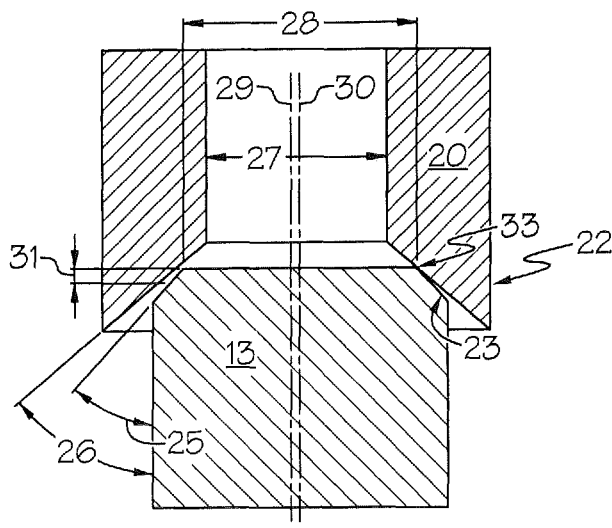
FIG. 10 illustrates a conical poppet seating surface engaging a conical stationary valve seat with misalignment of the poppet and stationary seat centerlines.
Figure 11A:
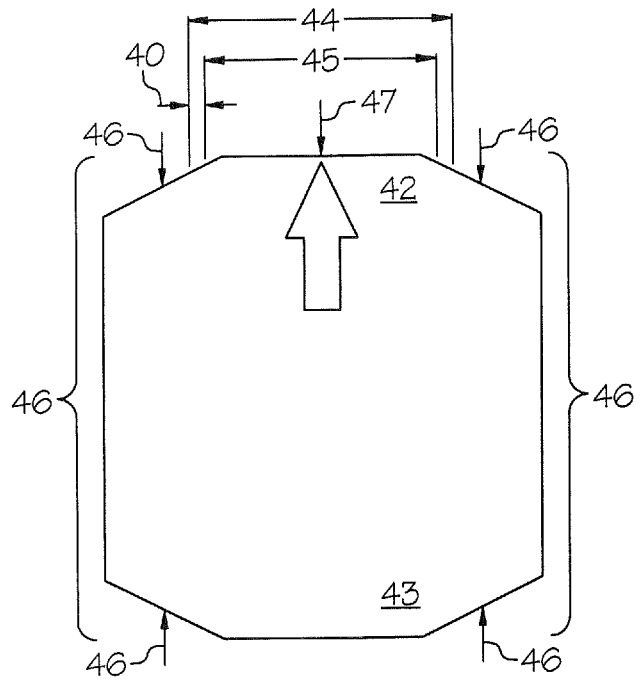
FIG. 11A illustrates the pressure distribution acting on a poppet when held against the valve seat.
Figure 11B:
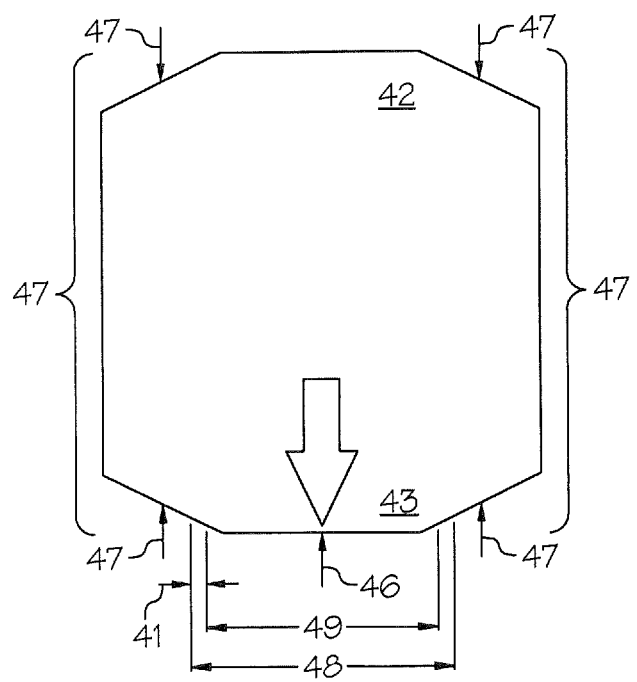
FIG. 11B illustrates the pressure distribution acting on a poppet when held against the guard seat.
Figure 12:
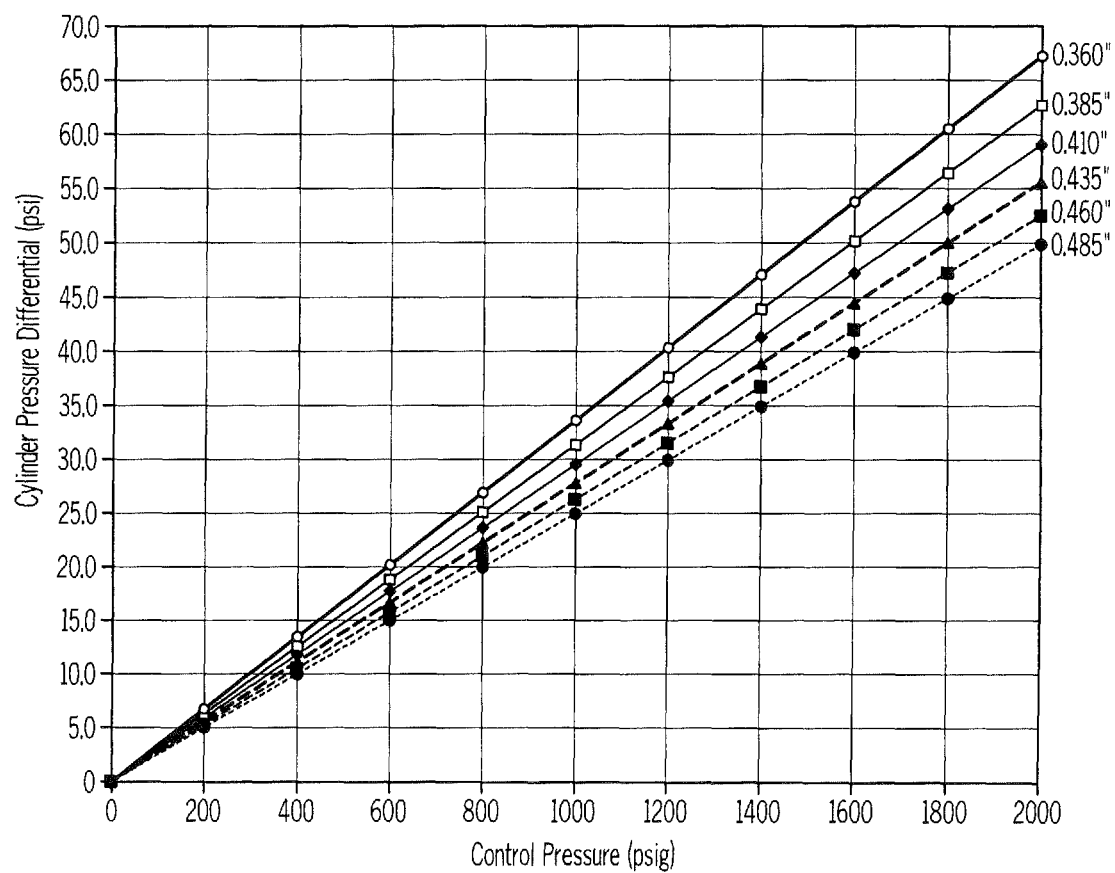
FIG. 12 illustrates a graphical representation of the differential between cylinder pressure and control pressure as a function of poppet sealing diameter for a fixed seat sealing width.
Figure 13:
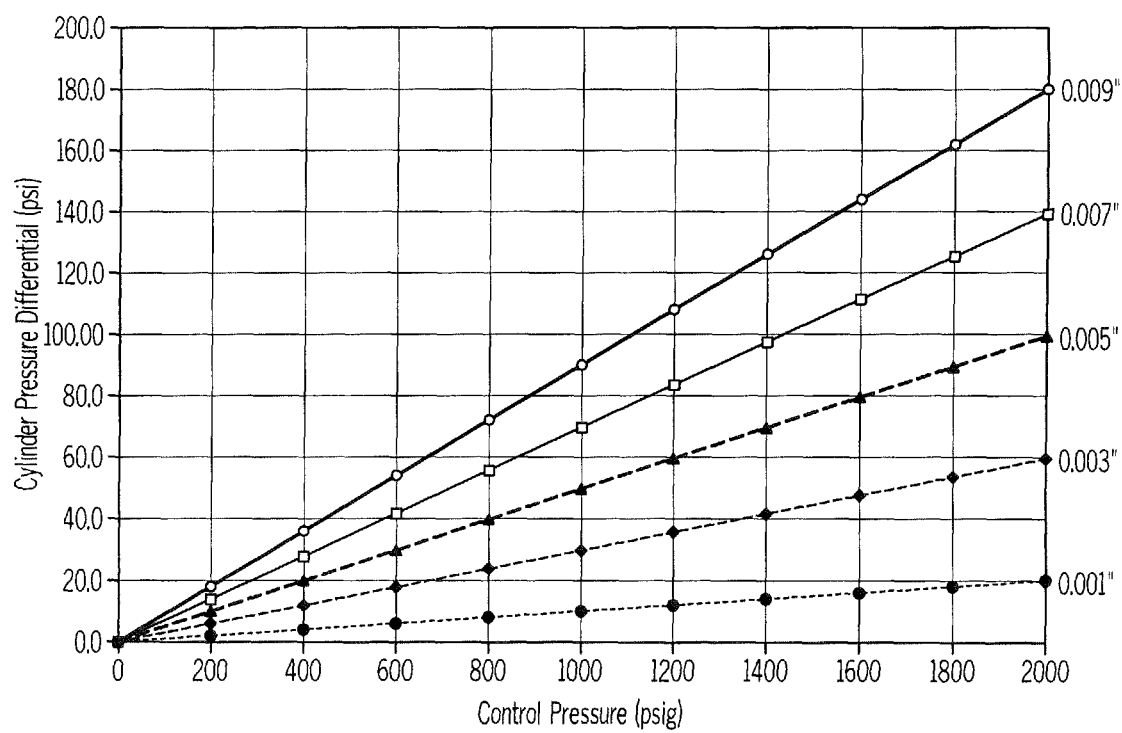
FIG. 13 illustrates a graphical representation of the differential between cylinder pressure and control pressure as a function of poppet seat sealing width for a fixed sealing diameter.
Figure 14:
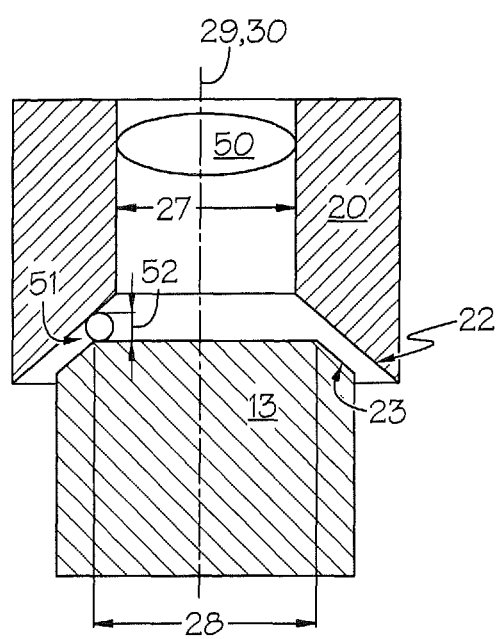
FIG. 14 illustrates a conical poppet seating surface separated from a conical stationary valve seat by the lift, or travel distance, of the poppet.

In light of the geometric features described above which are desirable for maximizing unloader efficiency and achieving acceptable poppet service life, the present invention discloses several poppet and valve seat parameters useful for optimizing unloader efficiency and reliability: (1) The poppet preferably has an outside diameter of no larger than 0.510 in. and no smaller than 0.490 in., more preferably no larger than 0.502 in. and no smaller than 0.498 in., and most preferably no larger than 0.500 in. and no smaller than 0.499 in.; (2) The conical angle of a stationary seat (referenced as 26 in FIG. 8) is no larger than 45 degrees and no smaller than 35, preferably no larger than 42.5 degrees and no smaller than 37.5, and most preferably 40 degrees; (3) For poppets having a conical poppet sealing face, the angle of the poppet seat (referenced as 25 in FIG. 8) is preferably no less than 1.0 degree and no more than 5.0 degrees larger than the conical angle of the mating stationary seat (referenced as 26 in FIG. 8), and more preferably 3.0 degrees larger than the conical angle of the stationary seat; (4) For poppets having a circular seat (as of the type shown in FIG. 9), the circular seat is designed to maintain the preferred sealing diameter requirement (see item 6, below) and to maintain acceptable impact stress in the poppet seat. The circular seat may be formed by a single radius, a blend of multiple radii, or a combination of one or more conical angles and one or more radii; (5) The port diameter (referenced as 27 in FIG. 8 and FIG. 9), is preferably no smaller than 0.380 in. and no larger than 0.410 in., and more preferably 0.400 in.; (6) The center or mean diameter of the narrow circular contact line between the conical poppet seat (referenced as 24 in FIG. 8, or the circular poppet seat 24 in FIG. 9) and the conical stationary seat that is preferably no less than 0.020 in. and no more than 0.045 in. larger than the port diameter, more preferably no less than 0.030 in. and no more than 0.044 in. larger than the port diameter, and most preferably no less than 0.038 in. and no more than 0.042 in. larger than the port diameter; (7) The poppet traveling distance, also referred to and labeled as the lift 52 in FIG. 14, is such that the lift area (which is calculated by multiplying the lift by the circumference of the inner diameter of the circular contact line between the poppet sealing face and the stationary conical seat) is no less than 97% and no more than 103% of the port area 50 in FIG. 14; and (8) For poppets having a conical poppet seat, the intersection of the conical surface and the outer diameter of the poppet is rounded with a radius of no less than 0.015 in., to reduce pressure drop caused by the corner and to avoid an otherwise sharp, weak corner that would chip or break off with repeated impact.

Flow Path Design Requirements—The rapid, cyclical flow occurring back and forth between the compressor cylinder volume and the clearance pocket volume with each stroke of the compressor piston should be as unrestricted as practical to maximize effectiveness and minimize pressure losses and resulting parasitic power losses. Minimization of flow restrictions is also desirable in order to minimize the differential between the cylinder pressure and the control pressure, once flow to and from the compressor cylinder volume occurs, to prevent fluttering (i.e., repeated unintended opening and closing) of the poppets. Fluttering of the poppets can increase parasitic power losses and reduce the reliability of the poppets and, therefore, of the unloader.

Figure 15A:
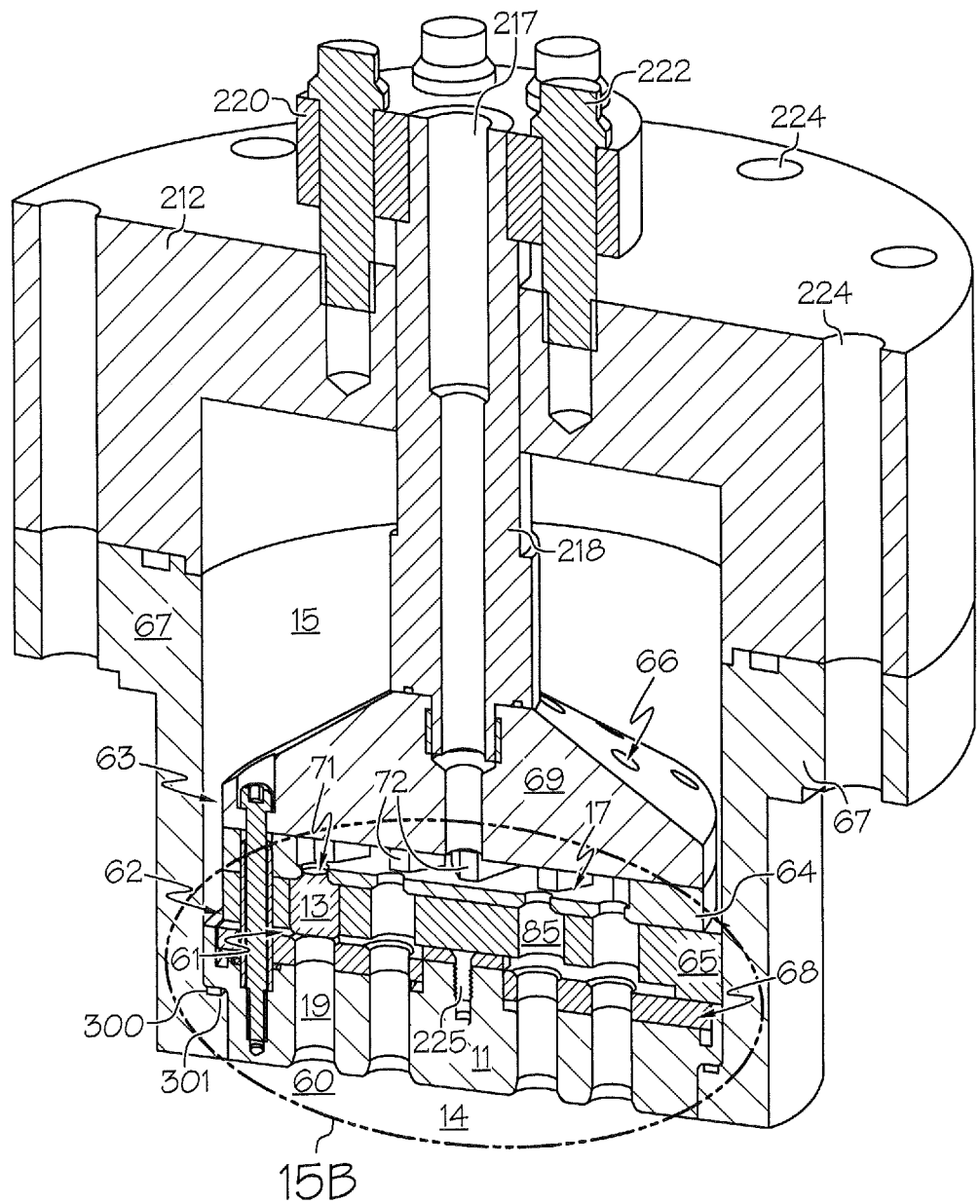
FIG. 15A illustrates a cross-section of an unloader assembly according to the present invention.

FIG. 15A shows a cross-section of one embodiment of an unloader assembly for a reciprocating compressor, according to the present invention. The unloader assembly includes an outer head 212 and an inner head 67, which are connected by retention bolts passing through holes 224. Together the outer head 212 and the inner head 67 form a clearance pocket volume 15 which is fluidly connected to the cylinder volume 14 of a reciprocating compressor. An outer control pressure port 217 passes through the outer head 212 (via a retainer post 218) and an unloader valve support dome 69 to reach an inner control pressure chamber 17 at one end. The other end of the outer control pressure port 217 is connected to an external pressure control valve or pressure regulator (not shown), as is known in the art. A retainer cap 220 is secured to the other head 212 via retainer cap bolts 222 so as to compress the retainer post 218 such that it clamps the support dome 66 and the rest of the internal assembly tightly against the sealing gasket 300 on the shoulder 301 within the inner head 67.

Figure 15B:
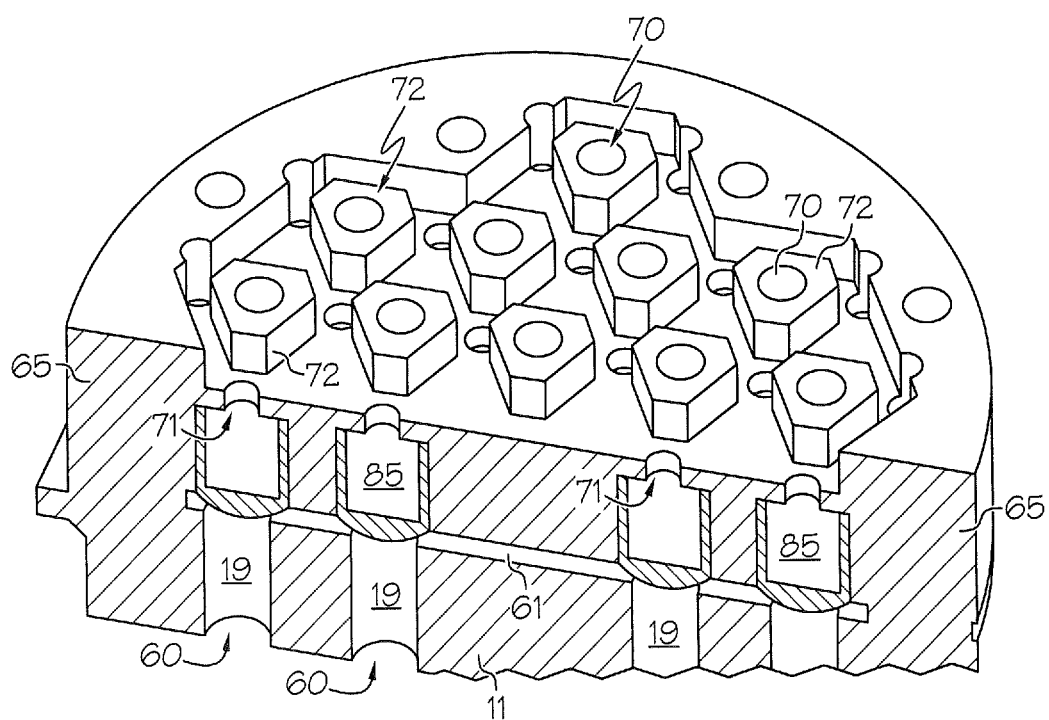
FIG. 15B is a perspective view of the valve seat area of the unloader assembly encircled in FIG. 15A.

Referring to FIGS. 15A and 15B, the path for the cyclic flow includes the entrances 60 from the compressor cylinder volume 14 to the multiple ports 19 in the valve seat 11, the aggregate area of the multiple ports 19 in the valve seat, the aggregate lift area 61 of the multiple poppets, the aggregate passage area 62 between the valve seat cushioning plate 68 and the valve guard 65 (or between the valve seat 11 and the valve guard 65 if no cushioning plate 68 is utilized), and the sum of the aggregate area of the multiple ports 66 in the unloader valve support dome 69 and the passage area 63 between the outer diameter of the valve guard 65 and the inner diameter of the head 67 to the clearance pocket volume 15; and all the way back again from the clearance pocket volume 15 to the compressor cylinder volume 14. The lift area 61 of the poppets is normally the limiting flow area, as it relates to the number of poppets and to the magnitude of the lift or opening distance of the poppets during operation. The number of poppets depends on the quantity that can be geometrically arranged in the valve seat 11 and the valve guard 65 while maintaining sufficient strength in the seat and guard. The optimal lift, or travel/opening distance of the poppet, is also determined by the impact stress on the poppet during operation at high speed. The maximum clearance pocket volume is determined by pressure losses resulting from the aforementioned flow path between the compressor cylinder volume 14 and the clearance pocket volume 15, including the aggregate poppet lift area 61.

The following two design relationships between the respective flow areas have been determined by the inventors to optimize efficiency and reliability. First, referring to FIG. 14, the lift area 51 (defined as the circumference of the inner edge of the circular contact line 28 between the conical poppet seat 23 or the circular poppet seat 32 and the conical stationary seat 22 multiplied by the lift or opening/traveling distance 52 of the poppet 13) is preferably no less than 95% and no more than 110% of the port area 50 in the stationary seat 20, and more preferably no less than 100% and no more than 105% of the port area 50 in the stationary seat 20. Second, the aggregate area of all passages or restrictive points communicating flow to and from the clearance pocket volume 15 and the poppet lift areas 51 when the poppets are open is no less than 125% of the sum of all of the port areas 50 in the valve seat, and preferably no less than 150% of the sum of all of the port areas 50 in the valve seat.

In order to meet the second design requirement noted above, the specific design shown FIGS. 15A and 15B is presented. This design may apply to the spacer plate 64 (FIG. 15A) or to a valve guard 65 which incorporates the features of the spacer plate 64 (FIG. 15B). The specific design feature is the incorporation of multiple posts 72, each post having a truncated triangular shape. The multiple posts 72 separate and support the spacer plate 64 or the valve guard 65 (shown in FIG. 15B incorporating the features of the spacer plate 64) against the unloader valve support dome 69, with the volume between the spacer plate 64 and the unloader valve support dome 69 forming the control pressure chamber 17. Looking at FIG. 15B, each post 72 has a central port 70 that aligns and communicates with a port 66 (FIG. 15A) in the unloader valve support dome 69 that communicates with the clearance pocket volume 15, such that the aggregate area of the ports 70 is additive to the passage area 63 between the outer diameter of the valve guard 65 and the inner diameter of the cylinder head 67 to the clearance pocket volume 15. Separate control pressure ports 71 are located between the multiple posts 72, and these ports 71 are aligned with their individual poppet guide recesses 85 to provide communication of gas from the control pressure chamber 17 to the stem ends of their respective poppets. The truncated triangle shape of each of the multiple posts 72 optimizes the support area provided by the posts and the flow area around the posts, while also enabling efficient machining by allowing milling of the posts 72 and the control pressure chamber 17 from a solid steel plate. Other shapes may be used depending on the manufacturing processes, the number of ports, and other specific requirements of applications.

Improved Poppet Designs—For successful application of the variable clearance system in high-speed compressors, improved poppet designs are provided by the present invention that can address the aforementioned limitations associated with high impact forces, stresses, and leakage past the poppet stems into and out of the control pressure chamber. Depending on the specific application and operating conditions of the reciprocating compressor system, several alternative designs incorporating some or all of the described features can be incorporated into the poppet design.

Figure 16A:
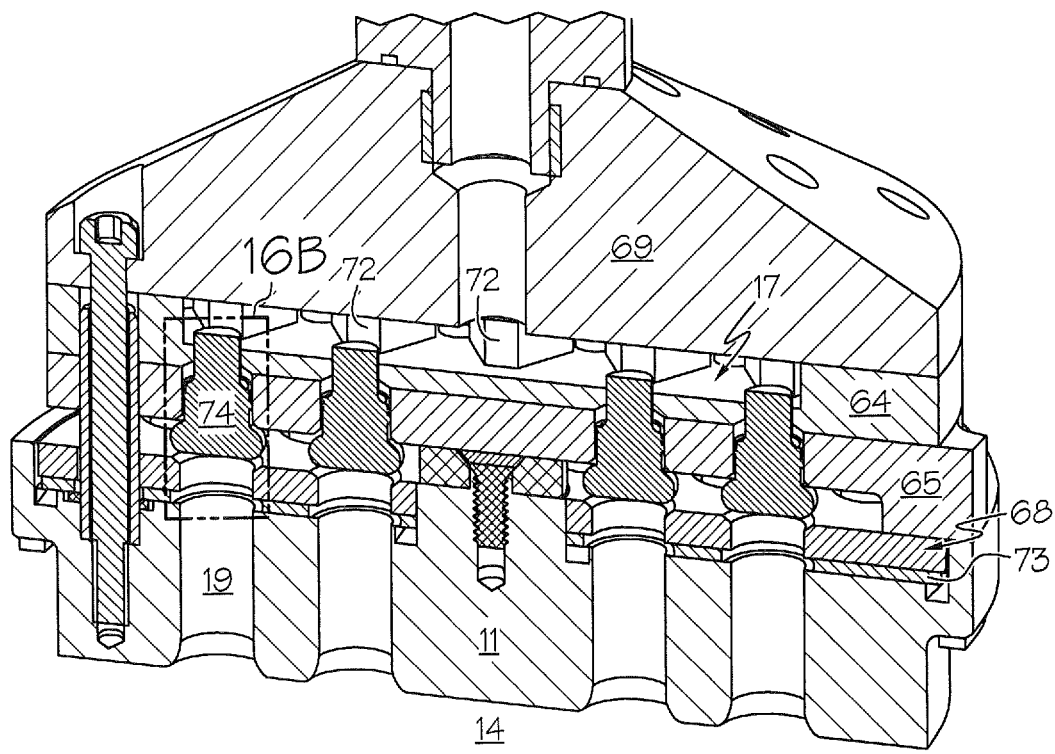
FIG. 16A illustrates a cross-section of an unloader assembly according to the present invention with a pressure breaker poppet having an extended sealing guide stem.
Figure 16B:
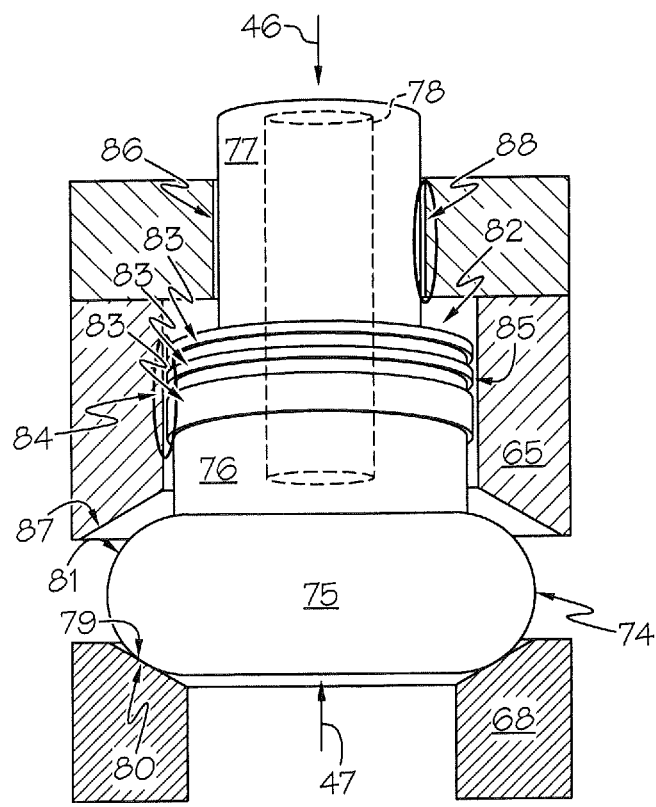
FIG. 16B is a perspective view of the pressure breaker poppet of FIG. 16A.

A) Pressure Breaker Poppet with Extended Sealing Guide Stem—Referring to FIGS. 16A and 16B, a pressure breaker poppet 74 includes a head end 75 having a first diameter, a stem end 76 having a second diameter that is smaller than the first diameter, and a sealing guide stem 77 having a third diameter which is smaller than the second diameter. This design results in the poppet 74 having a smaller mass than a prior art solid poppet with an overall diameter the same as the head end. The poppet 74 may be solid or hollow, containing an internal volume 78 which is based on an optimization of the requirements for high strength and low mass, in order to limit the impact stresses on the head end 75. The poppet material may be carbon-filled PEEK (polyether ether ketone), glass-filled PEEK or another high-strength, non-metallic material.

In the "closed" position, as shown in FIG. 16B, a lower sealing surface 79 of the poppet head end 75 is held in contact with the conical surface 80 of the valve seat cushioning plate 68 (or valve seat 11 if no cushioning plate is used). This occurs when the control pressure 46 is higher than the compressor cylinder pressure 47. In contrast, in the "open" position the cylinder pressure 47 is higher than the control pressure 46, and an upper sealing surface 81 of the poppet head end 75 is held in contact with the conical upper seating surface 87 of the valve guard 65. A control pressure volume 82 remains in the poppet guide recess 85 above the poppet stem 76 when in the closed position, and this volume 82 provides a cushioning effect as the poppet opens and moves towards the seating surface 87 of the valve guard 65, without creating excessive delay or parasitic energy loss.

Two or more pressure breaker steps 83 can be provided as radial protrusions projecting from the outer diameter of the stem end 76 of the poppet. These steps 83 interrupt the path of any leakage flow around the stem end, i.e. through the annular space 84 between the poppet stem 76 and the poppet guide recess 85 to and from the control pressure chamber 17 and the compressor cylinder 14 or the clearance pocket volume 15. The pressure breaker steps 83 may be radial protrusions with square edges as shown, or they may be radial protrusions with sharp edged labyrinth teeth, slanted protrusions with labyrinth teeth, or other geometric profiles or any combination of profiles. The outer diameter of the pressure breaker steps 83 is sized to fit inside the bore of the poppet guide recess 85 with minimal radial clearance. However, sufficient radial clearance is still provided so as not to interfere with the alignment of the lower sealing surface 79 of the poppet head end 75 with the conical surface 80 of the valve seat cushioning plate 68 (or valve seat 11, if no cushioning plate is used) upon closure, or with alignment of the sealing surface 81 of the poppet stem end 76 with the conical seating surface 87 of the valve guard 65 upon opening.

The change in diameter between the poppet guide recess 85 and the control pressure port 86 interrupts the path of any leakage to and from the control pressure chamber 17 and the compressor cylinder 14 or the clearance pocket volume 15. This interruption can create localized eddies and turbulence, which can create a localized pressure drop that interrupts, reduces and minimizes the rate of leakage. The annular space 88 between the outer diameter of the sealing guide stem 77 and the diameter of the control pressure port 86 is smaller and therefore more restrictive than the annular space 84 between the stem end 76 of the poppet and the poppet guide recess 85, and provides a further interruption in the path of any leakage to and from the control pressure chamber 17 and the compressor cylinder 14 or the clearance pocket volume 15. When the poppet 74 opens and closes, the aerodynamic frictional drag created by the pressure breaker steps 83 limits the velocity of the poppet as it moves across the gap from the valve guard 65 to the cushioning plate 68 (or to the valve seat 11 if no cushioning plate is used). This beneficial effect reduces the impact velocity and therefore the impact stress on the lower sealing surface 79 of the poppet head.

Figure 17:
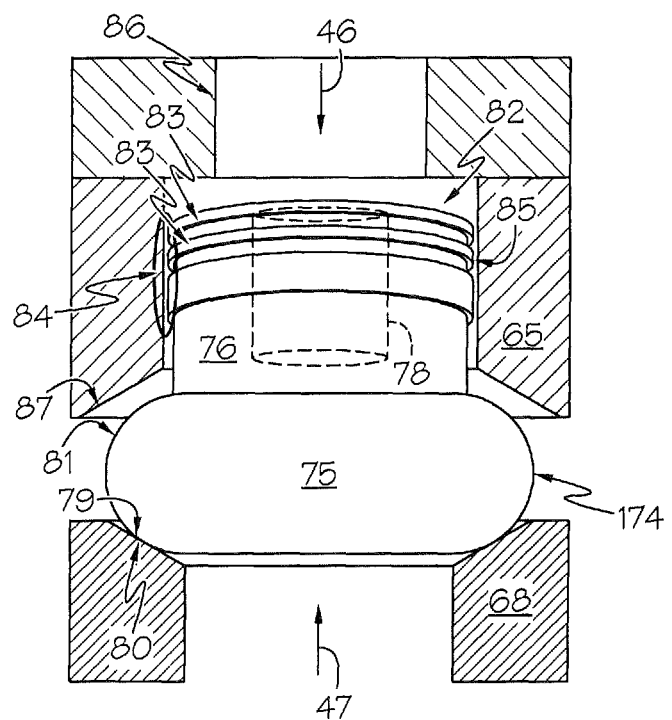
FIG. 17 is a perspective view of pressure breaker poppet without an extended sealing guide stem.

B) Pressure Breaker Poppet Without Extended Sealing Guide Stem—Referring to FIG. 17, a simplified version of the pressure breaker poppet 74 of FIGS. 16A and 16B is illustrated. This poppet 174 does not include an extended sealing guide stem ([77, see FIG. 16), and, although this version provides less resistance and/or interruption of leakage to and from the control pressure chamber 17, it has less mass and higher strength than the version of FIG. 16, which is useful for applications requiring both high speed and high compression ratios. The poppet 174 may be solid or hollow, containing an internal volume 78 which is based on an optimization of the requirements for high strength and low mass in order to limit the impact stresses on the head end 75. The poppet material may be carbon-filled PEEK, glass-filled PEEK or another high-strength, non-metallic material.

Figure 18A:
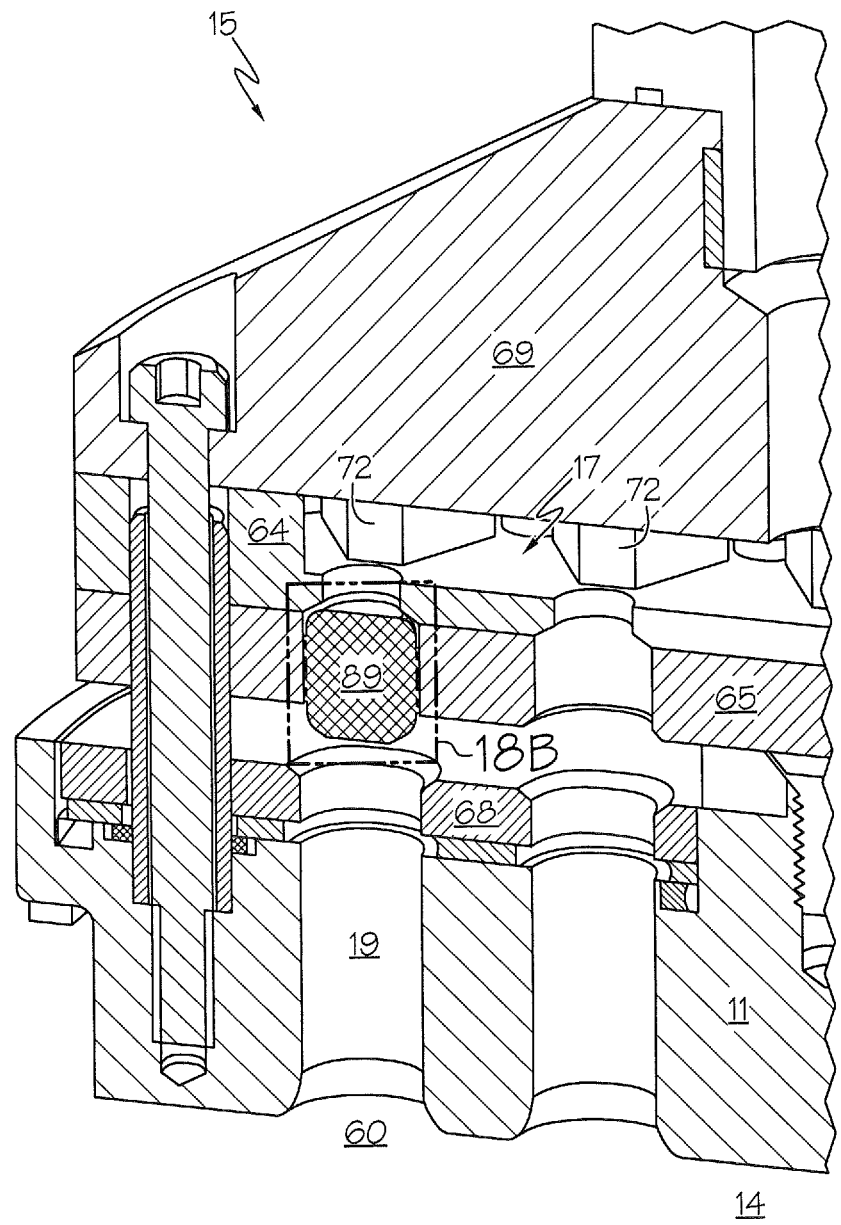
FIG. 18A illustrates a cross-section of a valve seat area of an unloader assembly including an impact tolerant self-sealing poppet.
Figure 18B:
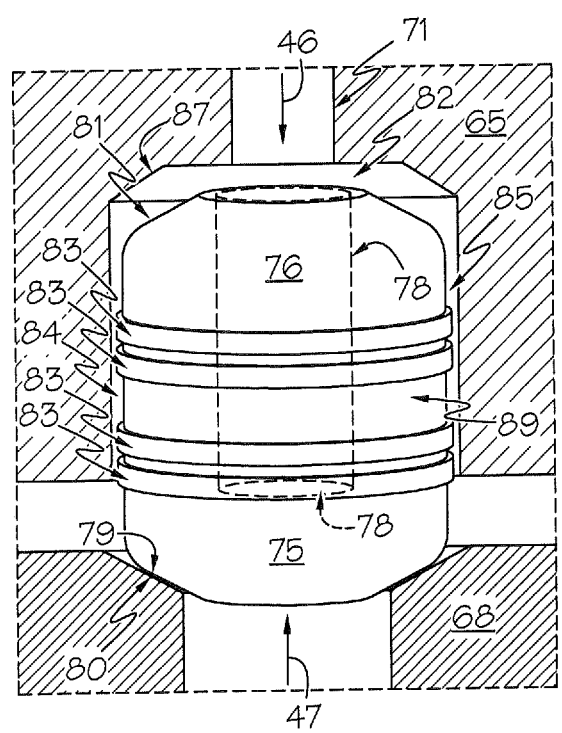
FIG. 18B is a perspective view of the self-sealing poppet of FIG. 18A.

C) Impact Tolerant Self-Sealing Poppet—Referring to FIGS. 18A and 18B, an impact tolerant self-sealing poppet 89 is illustrated which includes a head end 75 and a stem end 76 in which the diameter of the head end is substantially the same as the diameter of the stem end. The poppet 89 may be solid or hollow and contain an internal volume 78 based on an optimization of the requirements for high strength and low mass in order to limit the impact stresses on the head end 75.

In the "closed" position, as shown in FIG. 18B, the lower sealing surface 79 of the poppet head end 75 is held in contact with the conical surface 80 of the valve seat cushioning plate 68 (or directly with the valve seat 11 if no cushioning plate is used). This occurs when the control pressure 46 is higher than the compressor cylinder pressure 47. In contrast, in the "open" position the cylinder pressure 47 is higher than the control pressure 46, and the sealing surface 81 of the poppet stem end 76 is held in contact with the conical seating surface 87 of the valve guard 65. A control pressure volume 82 remains in the poppet guide recess 85 above the poppet stem 76 when in the closed position, and this control pressure volume 82 provides a cushioning effect as the poppet opens and moves towards the seating surface 87 of the valve guard 65, without creating excessive delay or parasitic energy loss.

Two or more pressure breaker steps 83 are provided on the outer diameter of the stem end 76 and two or more pressure breaker steps 83 are also provided on the outer diameter of the head end 75 of the poppet 89, such that the steps 83 interrupt the path of any leakage flow through the annular space 84 between the poppet 89 and the poppet guide recess 85 in the guard 65 to and from the control pressure chamber and the compressor cylinder or the clearance pocket volume. The pressure breaker steps may be radial protrusions with square edges as shown, radial protrusions with sharp edged labyrinth teeth, slanted protrusions with labyrinth teeth, pressure activated sealing strips, or they may be other geometric profiles or any combination of profiles. The outer diameter of each pressure breaker step 83 is sized to fit inside the bore of the poppet guide recess 85 with minimal radial clearance. However, sufficient radial clearance is still provided so as not to interfere with the alignment of the lower sealing surface 79 of the poppet head end 75 with the conical surface 80 of the valve seat cushioning plate 68 (or valve seat 11, if no cushioning plate is used) upon closure, or with alignment of the sealing surface 81 of the poppet stem end 76 with the conical seating surface 87 of the valve guard 65 upon opening.

The change in diameter between the poppet guide recess 85 and the control pressure port 71 interrupts the path of any leakage to and from the control pressure chamber 17 and the compressor cylinder 14 or the clearance pocket volume 15. This interruption can create localized eddies and turbulence, which can create a localized pressure drop that interrupts, reduces and minimizes the rate of leakage. When the poppet 89 opens and closes, the aerodynamic frictional drag created by the pressure breaker steps 83 limits the velocity of the poppet as it moves across the gap from the valve seat 68 to the valve guard 65. This beneficial effect reduces the impact velocity and therefore the impact stress on the poppet sealing surfaces 79, 81.

The impact tolerant self-sealing poppet 89 can be made of a resilient material such as carbon-filled PTFE, which is more impact resistant than PEEK or other materials. Depending on the application requirements, this poppet design can also be made of carbon-filled PEEK.

Figure 19:
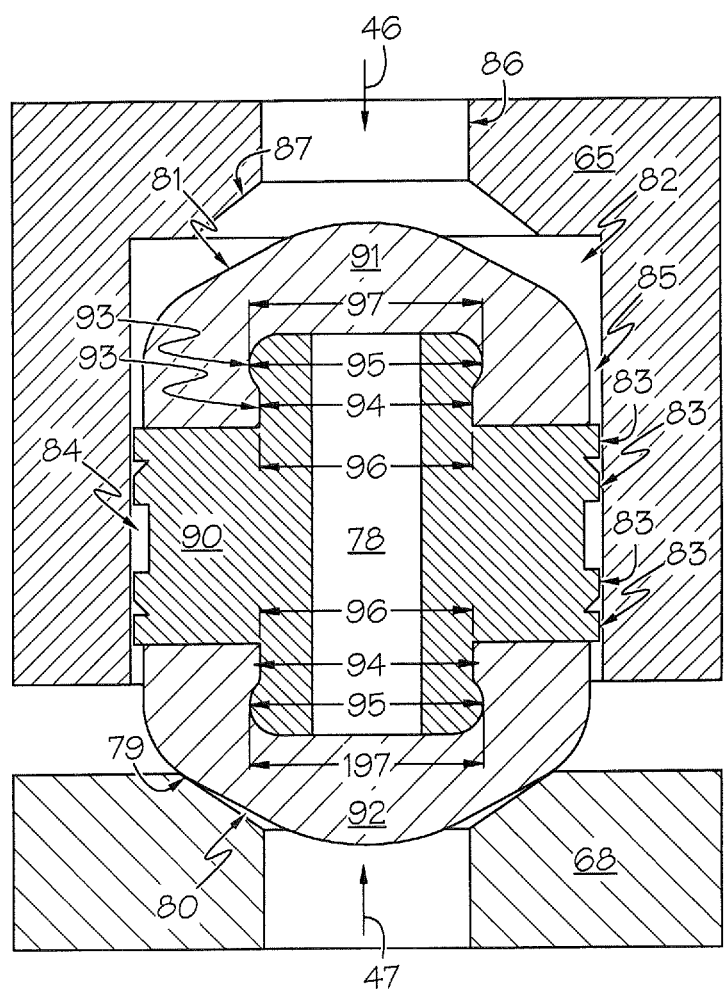
FIG. 19 is a perspective view of a self-sealing floating seat poppet.

D) Impact Tolerant Self-Sealing Floating Seat Poppet—Referring to FIG. 19 a multi-piece poppet is shown having a central core 90, the central core including bulbous-shaped ends for connection to a stem end piece 91 and a head end piece 92. The central core 90 can include a hollow portion 78 to reduce its mass, and the bulbous-shaped ends have a larger outer diameter 95 than the inner diameters 96, 196 of the end pieces 91, 92. During assembly, special tooling can be employed to elastically compress the bulbous ends of the central core 90 as they are connected to the end pieces 91, 92, and the bulbous ends can then recover their original shape, so that they remain engaged with and retained inside the two end pieces 91, 92. A radial clearance 93 is maintained between the inside diameter 96, 196 of each end piece and the diameter 94 of each stem of the central core 90 and also between the larger outer diameter 95 of the bulbous ends and the respective inside diameters 97, 197 of the end pieces. The radial clearance permits the end pieces 91, 92 to "float" or move radially to align with the conical surface 80 of the valve seat cushioning plate 68 (or the valve seat 11 if no cushioning plate is used) and the conical seating surface 87 of the valve guard 65, as the central core 90 remains aligned with the poppet guide recess 85.

In the closed position illustrated in FIG. 19, the lower sealing surface 79 of the poppet head end 92 is held in contact with the conical surface 80 of the stationary valve seat cushioning plate 68 (or the valve seat 11, if no cushioning plate is used). This occurs when the control pressure 46 is higher than the compressor cylinder pressure 47. In contrast, in the "open" position the cylinder pressure 47 is higher than the control pressure 46, and the sealing surface 81 of the poppet stem end 91 is held in contact with the conical seating surface 87 of the valve guard 65. A control pressure volume 82 remains in the poppet guide recess 85 above the poppet stem 76 when in the closed position, and this volume 82 provides a cushioning effect as the poppet opens and moves towards the seating surface 87 of the valve guard 65, without creating excessive delay or parasitic energy loss.

A plurality of pressure breaker steps 83 (e.g. four, as shown in FIG. 19) can be provided on the outer diameter of the central core 90, such that the steps interrupt the path of any leakage flow through the annular space 84 between the central core 90 of the poppet and the poppet guide recess 85 in the guard 65 to and from the control pressure chamber 17 and the compressor cylinder 14 or the clearance pocket volume 15. The pressure breaker steps 83 may be radial protrusions with square edges as shown, radial protrusions with sharp edged labyrinth teeth, slanted protrusions with labyrinth teeth, pressure activated sealing strips, or they may be other geometric profiles or any combination of profiles.

The outer diameter of the pressure breaker steps 83 is sized to fit inside the bore of the poppet guide recess 85 with minimal radial clearance. However, there is still sufficient radial clearance so as not to interfere with the alignment of the lower sealing surface 79 of the poppet head end 75 with the conical surface 80 of the valve seat cushioning plate 68 upon closure, or with alignment of the sealing surface 81 of the poppet stem end 76 with the conical seating surface 87 of the valve guard 65 upon opening.

The change in diameter between the poppet guide recess 85 and the control pressure port 86 interrupts the path of any leakage to and from the control pressure chamber 17 and the compressor cylinder 14 or the clearance pocket volume 15. This interruption can create localized eddies and turbulence, which can create a localized pressure drop that interrupts, reduces and minimizes the rate of leakage. When the poppet 89 opens and closes, the aerodynamic frictional drag created by the pressure breaker steps 83 limits the velocity of the poppet as it moves across the gap from the valve seat 68 to the valve guard 65. This beneficial effect reduces the impact velocity and therefore the impact stress on the poppet sealing surfaces 79, 81.

The central core 90 can be made of a resilient material, such as carbon-filled PTFE, or a stronger material such as carbon-filled PEEK, or any other non-metallic material of sufficient strength and temperature rating. When the central core is made of a resilient material, it increases the impact resistance of the poppet. The end pieces 91, 92 can be made of a stronger non-metallic material such as carbon-filled PEEK, glass-filled PEEK, or other material of sufficient temperature rating and impact strength.

E) Diaphragm Seal Poppet—This poppet includes a head end and a stem end in which the diameter of the head end is substantially the same as the diameter of the stem end, and a diaphragm seal 98, as described below and illustrated in FIG. 20. The diaphragm seal valve poppet is an alternative embodiment of the improved poppet designs described above. This design eliminates the problem of leakage past the poppets, and the resulting effect such leakage can have on the control pressure. The diaphragm seal poppet is particularly applicable when the unloader valve assembly is used in compressors with low molecular weight gases such as hydrogen, helium or mixtures of gases that contain mostly hydrogen.

Figure 20:
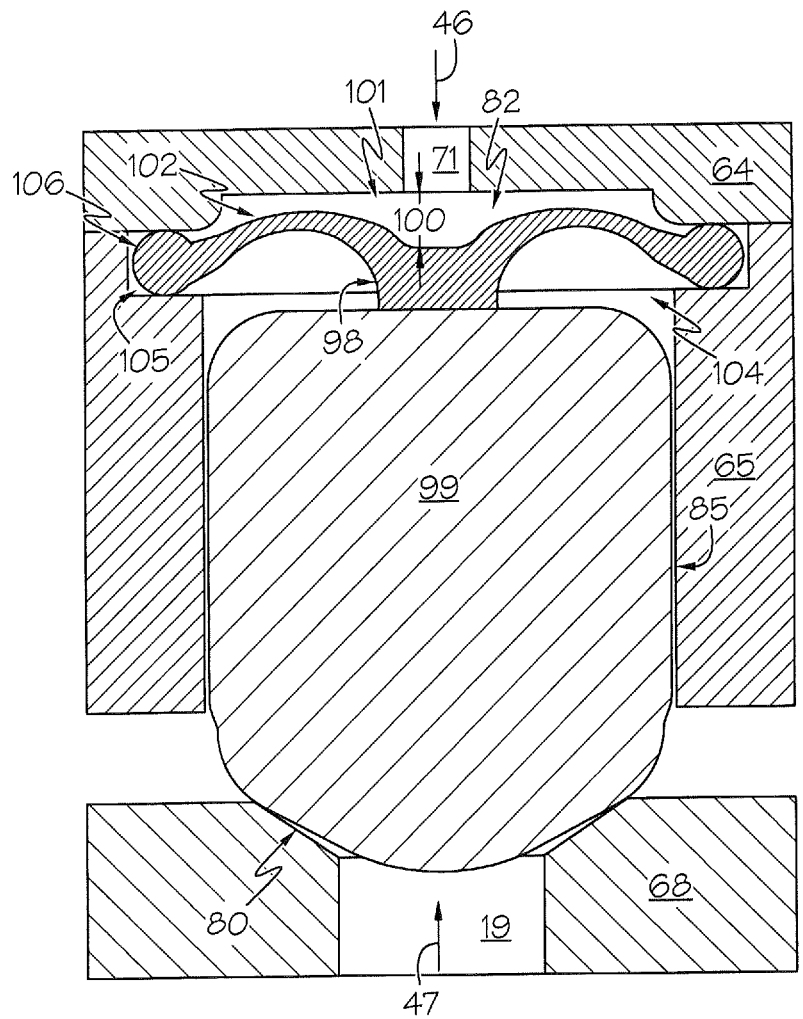
FIG. 20 is a perspective view of a diaphragm seal poppet.

Referring to FIG. 20, a flexible diaphragm seal 98 is employed over the stem end of each poppet 99 to prevent leakage of gas between the control pressure 46 in the control pressure port 71 and compressor cylinder pressure 47 in the valve seat port 19 or the clearance pocket volume. The poppet diaphragm seal 98 has a bulbous outer diameter 106, similar to an O-ring, that clamped by a control chamber spacer plate 64 into a recess 105 of the valve guard 65. This is useful in preventing the leakage of gas around the poppet and the seal.

Since there is no longer a leakage path between the outer diameter of the poppet and the poppet guide recess 85 in the valve guard 65, this configuration permits the radial clearance between the poppet 99 and the poppet guide recess 85 to be large enough to ensure that the poppet can float radially and align with the conical surface 80 of the valve seat cushioning plate 68 (or valve seat 11 if no cushioning plate is used) without contacting the walls of the poppet guide recess 85 in the valve guard 65. When the control pressure 46 exceeds the cylinder pressure 47 by an amount that is proportional to the ratio of the poppet head end seating area to the area of the poppet stem end, the diaphragm seal 98 is pushed against the top edge of the poppet 99, holding it against the conical surface 80 of the valve seat cushioning plate 68, as shown in FIG. 20 (or valve seat 11 if no cushioning plate is used). When the cylinder pressure 47 exceeds the control pressure 46 by an amount that is proportional to the ratio of the area of the poppet stem end to the poppet head end seating area, the poppet 99 is pushed against the bottom of the diaphragm seal 98. This pushes the diaphragm seal 98 across the lift or opening distance 100 until it rests against the diaphragm seal seating recess 101. The diaphragm seal 98 incorporates one or more strain relief loops 102 that reduce the bending stress in the seal as it deflects across the opening distance 100. The diaphragm seal seating recess 101 is designed to accommodate a specific amount of opening distance 100 and the elastic deformation of the seal 98 without excessively high bending stresses occurring in the diaphragm seal 98. The shape of the diaphragm seal 98 may be as shown in FIG. 20, or it may be any other shape that serves the same purposes of reliably accommodating the poppet lift 100 and sealing between the control pressure volume 82 and the poppet guide volume 104.

Use of the diaphragm seal 98 arrangement as shown in FIG. 20 allows the poppet 99 to have generous radial clearance with the poppet guide recess 85, making the poppet seating more tolerant of misalignment of the poppet guide recess 85, the poppet 99, and the conical surface 80 of the valve seat cushioning plate 68 (or valve seat 11 if no cushioning plate is used). It also permits somewhat less precision in the alignment required between the valve seat cushioning plate 68 (or valve seat 11 if no cushioning plate is used) and the valve guard 65. The diaphragm seal 98 can be made of an elastomeric material such as fluorocarbon, ethylene propylene, nitrile, polyester or polyether urethane, tetrafluoroethylene-propylene or other similar compounds. The seal material is preferably selected based on the operating conditions, amount of elastic stretch required and compatibility with the gas composition and any contaminants, including lubricants, in the gas stream.

Figure 6A:
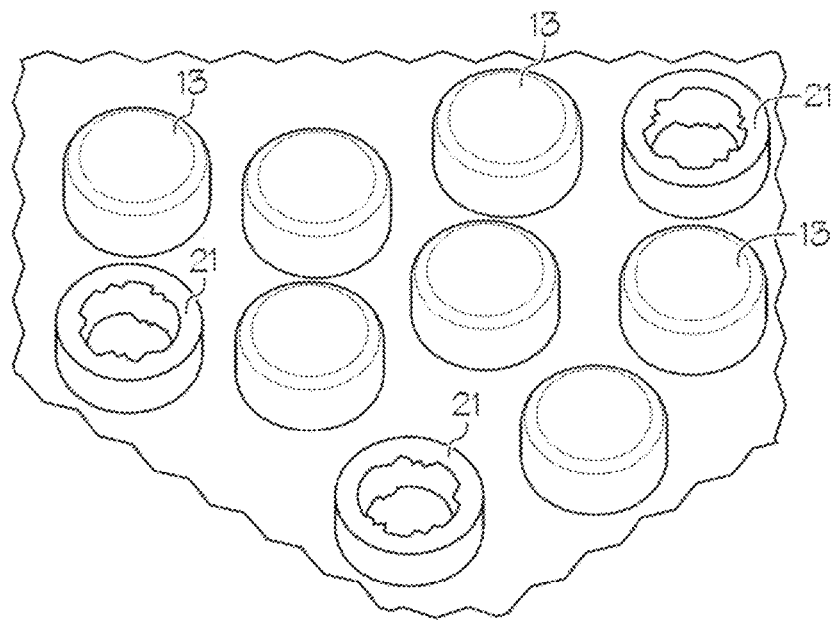
FIG. 6A illustrates failed poppets of a prior art variable clearance system for high-speed reciprocating compressors.
Figure 6B:
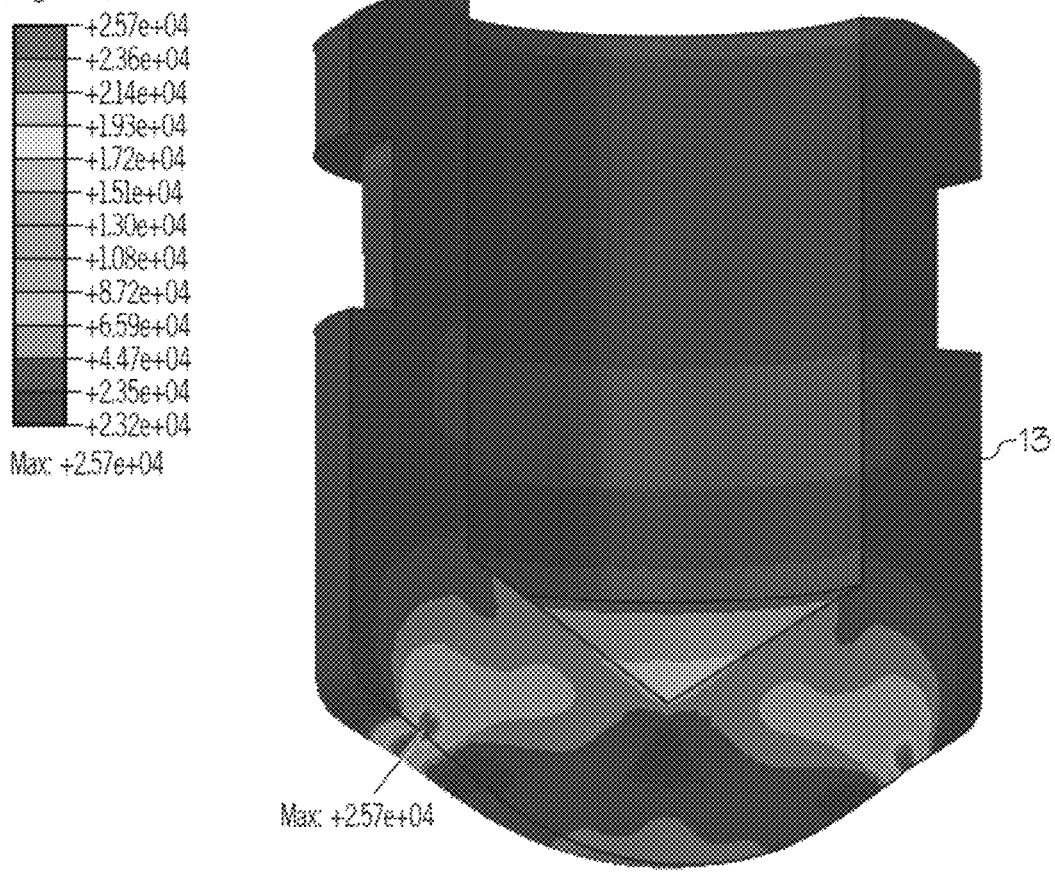
FIG. 6B illustrates calculated poppet impact stresses which typically result from application of prior art variable clearance system for high-speed reciprocating compressors.
Figure 7:
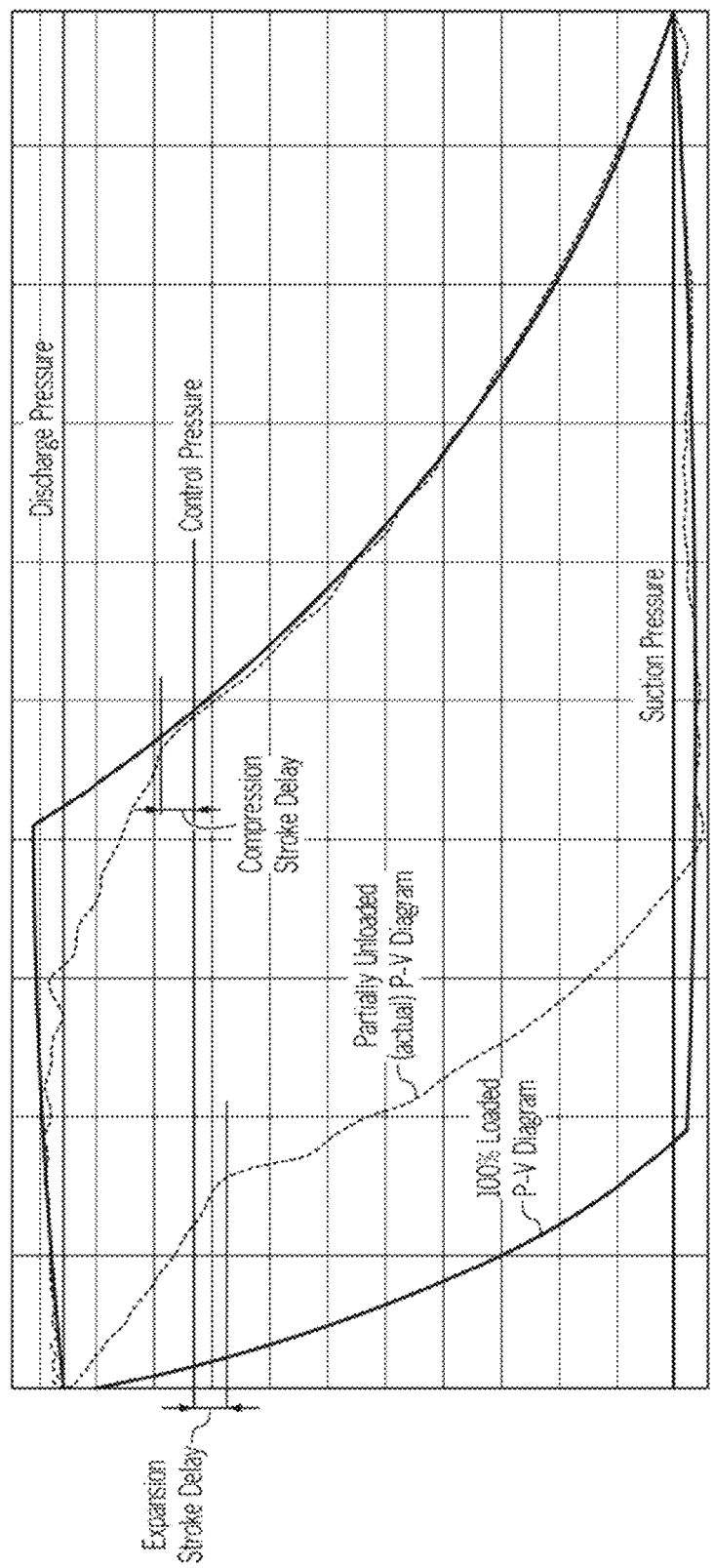
FIG. 7 illustrates a pressure-volume diagram for a prior art variable clearance system for high-speed reciprocating compressors.

Passive Valve Seat Cushioning Plate—Referring back to FIG. 6, it is notable that one problematic characteristic of prior art poppets is that when a poppet fails, the failure originates in the lower sealing surface of the poppet head, but not in the stem end sealing surface. Compressor speeds at or above 1000 rpm can cause such failed poppets, and this is a significant limiting factor in the application of prior art variable clearance systems and poppets to modern high-speed compressors. Improvements are therefore necessary and desirable to make such prior art systems applicable to high-speed compressors. For example, the inventive poppet 89 as illustrated FIGS. 18A and 18B can be positioned in a guide recess 85 that includes a relatively small control pressure volume 82 communicating with the control pressure chamber 17 via the control pressure port 71 in the valve guard 65. Therefore, as the poppet moves toward the stem end of the guide recess 85, the gas acts like a spring as the poppet forces gas through the port 71 and into the control pressure chamber 17. The compression work done by the poppet slows the rate of deceleration and provides an effective cushioning of the poppet as it approaches the guard seat 87. However, when the poppet changes direction and moves toward the valve seat cushioning plate 68 (or the valve seat 11, if no cushioning plate is used), there is comparatively little resistance between the lower sealing surface 79 of the poppet head 75 and the conical surface 80 of the stationary cushioning plate 68. This lack of resistance at the head end of the poppet exists because the gas can flow through the multiple ports 19 in the valve seat 11 into the much larger cylinder volume 14, and also into the clearance pocket volume 15. As a result, the poppet is not decelerated, and it impacts the seat surface 80 with much higher impact velocity and force.

Figure 21:
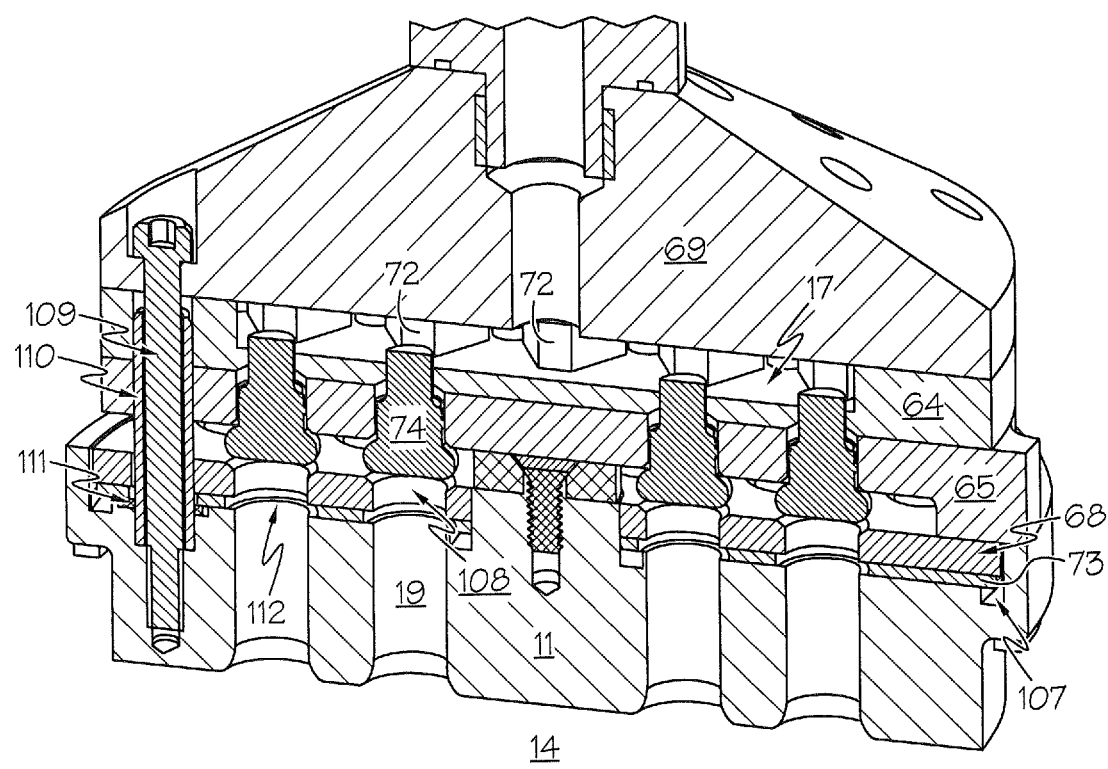
FIG. 21 illustrates a cross-section of the present invention showing a passive valve seat cushioning plate with a cushioning pad element.

The present invention provides a means for cushioning the impact of the head ends of the poppets with the stationary valve seats. Referring to FIG. 21, a valve seat cushioning plate 68 is oriented over the valve seat 11 and aligned by two or more precision guide sleeves 110, each of which is retained by a cap screw 109 and sealed by an O-ring 111, such that ports 108 in the valve seat cushioning plate 68 align with the ports 19 in the valve seat 11. The valve seat cushioning plate 68 can be constructed of a non-metallic material, such as carbon-filled PEEK or glass-filled PEEK, which is more resilient than a metallic seat and can reduce the magnitude of impact stresses acting on the sealing surfaces of the poppets. The valve seat cushioning plate 68 can also be constructed of a metallic material, such as steel or stainless steel, which can minimize the wear rate of the conical seats in the cushioning plate. In either case, a cushioning element can be positioned between the cushioning plate 68 and the valve seat 11. As discussed in more detail below, the cushioning element between the valve seat 11 and the cushioning plate 68 can be a cushioning pad 73 (see FIGS. 16A and 21), an O-ring 107 (see FIGS. 22A and 22B), a spring 115 (see FIGS. 23A and 23B), or a combination of thereof.

Figure 22A:
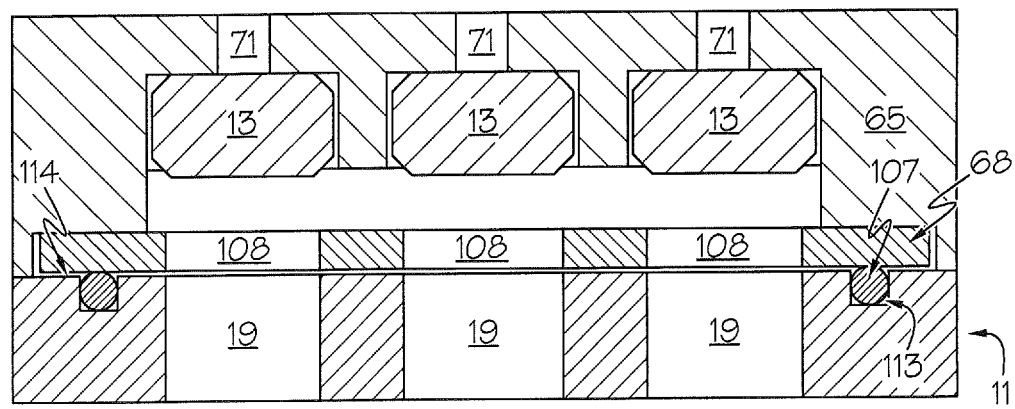
FIG. 22A illustrates a passive valve seat cushioning plate with an o-ring cushioning element, showing the poppets held against the valve guard.
Figure 22B:
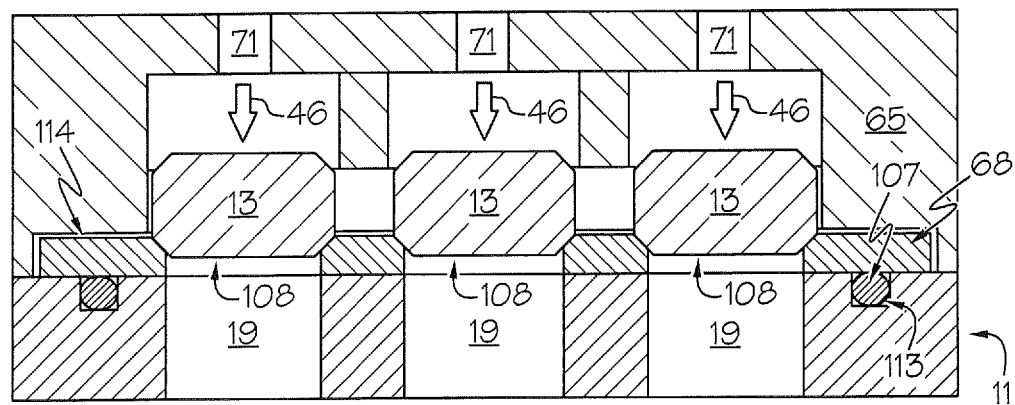
FIG. 22B illustrates a passive valve seat cushioning plate with an o-ring cushioning element, showing the poppets held against the valve seat plate.

Referring to FIG. 22A, an O-ring 107 is shown positioned in a groove 113 in the valve seat 11. When the cylinder pressure acting through ports 19 exceeds the control pressure acting through control pressure ports 71, so that the stem ends of the poppets 13 are held against the valve guard 65, the valve seat cushioning plate 68 is lifted by the O-ring 107 off of the valve seat 11 by a distance 114, such that the top surface of the valve seat cushioning plate 68 is in contact with the valve guard 65. Referring to FIG. 22B, when the control pressure 46 (arrows) exceeds the cylinder pressure, the head ends of the poppets 13 are forced into contact with the conical seats 108 of the valve seat cushioning plate 68, and the aggregate force applied by the poppets 13 compresses the O-ring 107 and forces the bottom surface of the valve seat cushioning plate 68 into contact with the valve seat 11. The resilience and damping provided by the compression of the O-ring 107 within the groove 113 increases the deceleration time of the poppets 13 as they come into contact with the conical seats 108 in the valve seat cushioning plate 68, such that the impact stress on the poppet sealing surfaces is reduced.

The O-ring cushioning element 107 preferably has a cross-sectional diameter of at least 0.103 in., more preferably a cross-sectional diameter of at least 0.201 in., and most preferably a cross-sectional diameter of 0.275 in., and can be constructed from an elastomeric material such as fluorocarbon, ethylene propylene, nitrile, polyester or polyether urethane, tetrafluoroethylene-propylene or other similar compounds. The O-ring material can be selected based on the operating conditions and compatibility with the gas composition and any contaminants, including lubricants, in the gas stream. The Shore hardness of the O-ring is preferably at least 85 durometer or higher. The compressed distance 114 is determined such that each cycle of the poppets compresses and relaxes the O-ring 107 by a minimum of 1% to 2% of the cross-sectional diameter, preferably a minimum of 3% to 4%, and most preferably a minimum of 5% to 6% of the cross-sectional diameter.

Referring to FIG. 21, the cushioning element can also include a cushioning pad 73 that is very lightly clamped by the valve guard 65 between the valve seat cushioning plate 68 and the valve seat 11. The O-ring 107 in this embodiment mainly serves as a pressure seal that provides minimal cushioning. The damping pad is constructed of virgin PTFE material having a Shore hardness of about 50 or a lightly-filled PTFE material having a Shore hardness of about 60 that is oriented between the valve seat cushioning plate 68 and the valve seat 11 and aligned by two or more precision guide sleeves 110, each of which is retained by a cap screw 109 and sealed by an O-ring 111, such that ports 112 in the cushioning pad 73 align with the ports 108 in the valve seat cushioning plate 68 and the ports 19 in the valve seat 11.

The cushioning pad 73 thickness preferably ranges from a minimum of 0.030 in. to a maximum of 0.100 in., and more preferably between a minimum thickness of 0.060 in. and a maximum thickness of 0.065 in. When the cylinder pressure exceeds the control pressure, the stem ends of the poppets 74 are held against the sealing surface of a control chamber spacer plate 64 (which can be associated with or part of the valve guard 65), and the cushioning pad 73 is very lightly clamped by the valve guard 65 acting on the valve seat cushioning plate 68. When the control pressure exceeds the cylinder pressure and the poppets change direction and move toward the valve seat cushioning plate 68, the head ends of the poppets 74 are forced against the valve seat cushioning plate 68, which creates a compressive force on the cushioning pad 73. The cushioning pad 73, being of a material that is much softer and more resilient than the valve seat cushioning plate 68, provides a cushioning and damping effect that increases the deceleration time of the poppets as they come into contact with the individual conical seats in the valve seat cushioning plate 68, such that the impact stress on the poppet sealing surfaces is reduced.

Figure 23A:
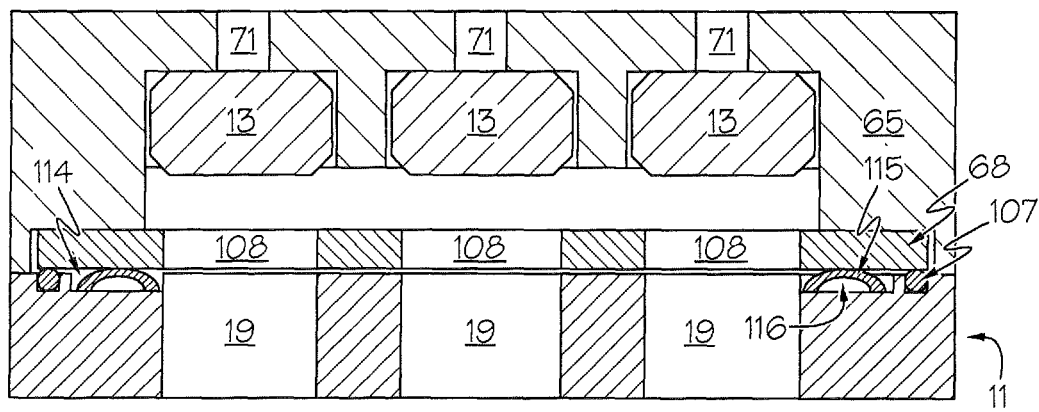
FIG. 23A illustrates a passive valve seat cushioning plate with a spring cushioning element, showing the poppets held against the valve guard.
Figure 23B:
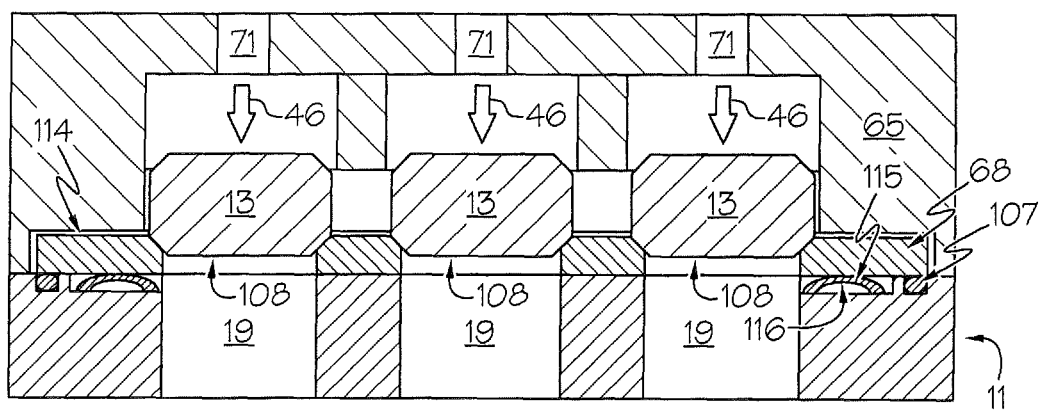
FIG. 23B illustrates a passive valve seat cushioning plate with a spring cushioning element, showing the poppets held against the valve seat plate.

Referring to FIGS. 23A and 23B, the cushioning element can also include a spring 115 positioned in a groove 116 in the valve seat 11. Looking at FIG. 23A, when the cylinder pressure acting through ports 19 exceeds the control pressure acting through control pressure ports 71, so that the stem ends of the poppets 13 are held against the valve guard 65, the spring 115 lifts the valve seat cushioning plate 68 off the valve seat 11 by a distance 114 such that the valve seat cushioning plate 68 is in contact with the valve guard 23. Referring to FIG. 23B, when the control pressure 46 (arrows) exceeds the cylinder pressure, the head ends of the poppets 13 are forced into contact with the conical seats 108 of the valve seat cushioning plate 68, and the aggregate force applied by the poppets 13 compresses the spring 115 and forces the valve seat cushioning plate 68 into contact with the valve seat 11. The resilience and damping of the spring 115 increases the deceleration time of the poppets 13 as they come into contact with the conical seats 108 in the valve seat cushioning plate 68, such that the impact stress on the poppet sealing surfaces is reduced. The spring can be a single wafer spring, or a single spiral wound spring, multiple coil springs acting in parallel, multiple Bellville washers acting in parallel or any other type of spring or combination of springs as is known in the art that is sufficiently compact and provides the required force and spring rate.

Presented here in FIGS. 24A through 24D is representative test data that demonstrates the successful high-speed operation of a variable clearance system that incorporates the improvements of the present invention including the pressure breaker valve poppet with extended sealing guide stem (item 74 in FIGS. 16A and 16B) and the passive valve seat cushioning plate (element 68 in FIGS. 22A and 22B). The tested compressor cylinder was a double-acting configuration with a 6.5 in, bore diameter and a 3.0 in. stroke. The cylinder end closest to the compressor crankshaft (referred to as the crank end or "CE") operated at full capacity with no capacity control applied throughout the testing. The end farthest from the compressor crankshaft (referred to as the head end or "HE") had a 75.4 $in^3$ clearance pocket that was connected utilizing a variable clearance system that incorporated the improvements and above-described features of the present invention. This enabled, when operating at higher speeds than was possible with the prior art, the capacity of the cylinder to be varied by changing the control pressure Pc within the variable clearance system.

Figure 24A:
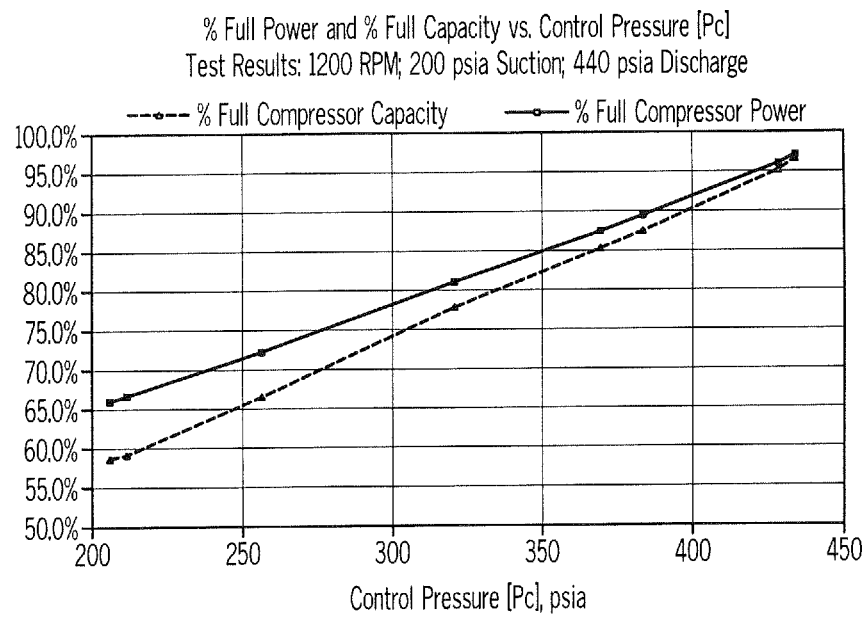
FIGS. 24A-24D illustrate test data demonstrating the improvements of the present invention over similar prior art systems.

FIG. 24A contains plots of measured capacity and the measured power as percentages of full capacity and full power, respectively, versus the variable clearance system control pressure Pc for the previously described double-acting compressor cylinder operating on nitrogen gas at 1200 rpm with a 200 psia suction pressure, 90° F. suction temperature and 440 psia discharge pressure. The control pressure was varied from 205.9 to 433.9 psia in this data set. The data demonstrates that as the control pressure was progressively reduced, the compressor cylinder capacity and the required compression power were reduced as intended. At this operating condition, reducing the control pressure reduced the capacity progressively to a minimum of 58.6% of the combined full capacity of the head end and the crank end of the cylinder. The required power was similarly reduced progressively to 66% of the combined full power required for head end and crank end of the cylinder. The percentage reduction of power is less than the percentage reduction of capacity because of parasitic losses generated by the pressure drop of the rapidly reversing flow through the valve in the variable clearance system, increasing as the control pressure was reduced. It is noted that the test results shown in FIG. 24A are for an unloader valve assembly that did not include the optimized flow path design relationships described above, which were added after testing to further reduce the parasitic losses.

Figure 24B:
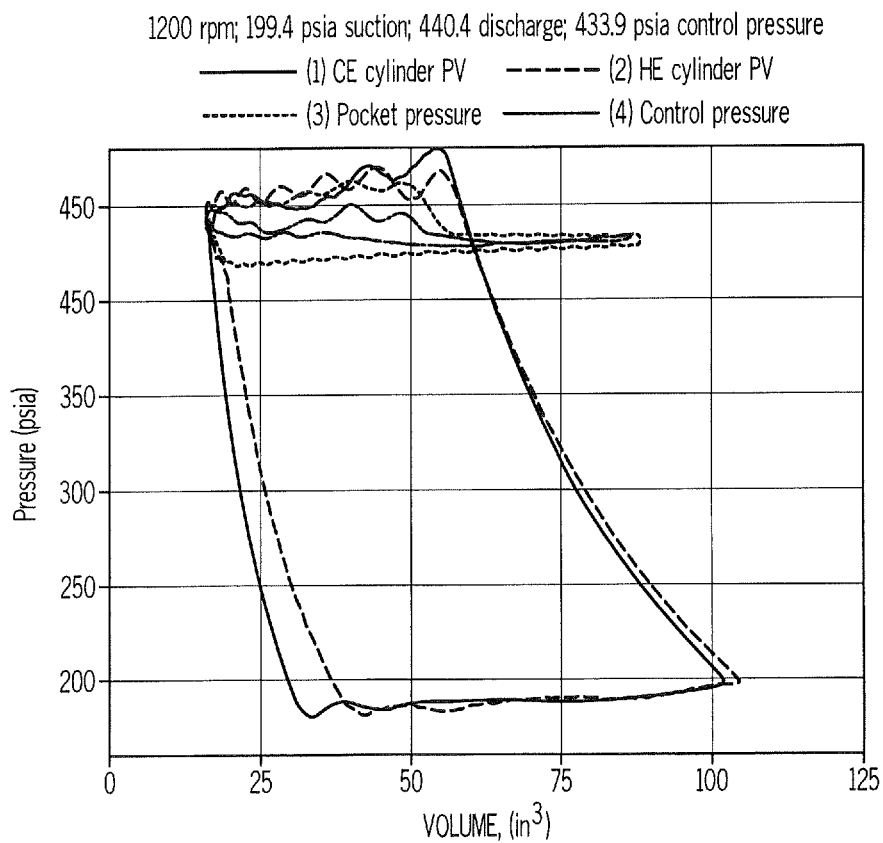

FIG. 24B contains the actual pressure vs. compressor cylinder volume plots that resulted from setting the control pressure at 433.9 psia, which is the highest capacity presented in the data from FIG. 24A. Plot (1) is the actual PV of the CE cylinder, which is essentially the same as the PV of the HE cylinder when operating at full capacity without the effects of the variable clearance system. Plot (2) is the actual PV of the HE cylinder with the control pressure set at 433.9 psia in the variable clearance system. Plot (3) is the control pressure as measured in the control line external to the variable clearance system. The control pressure measurement location resulted in a phase lag between the indicated control pressure and the actual control pressure, however it provides a relative verification of the control pressure level for reference. Plot (4) is the pressure inside the clearance pocket volume of the variable clearance system. It shows that the pressure inside the clearance pocket decreases with the HE cylinder pressure until the HE cylinder pressure is slightly less than the control pressure, at which point the poppets are held closed by the control pressure; and then it is relatively constant until the HE cylinder pressure slightly exceeds the control pressure, at which point the poppets open again. The similar widths of plots (1) and (2) show that the HE is only slightly unloaded, in this case approximately 8% less than full capacity of the HE and approximately 4% less than the full combined HE and CE cylinder capacity.

Figure 24C:
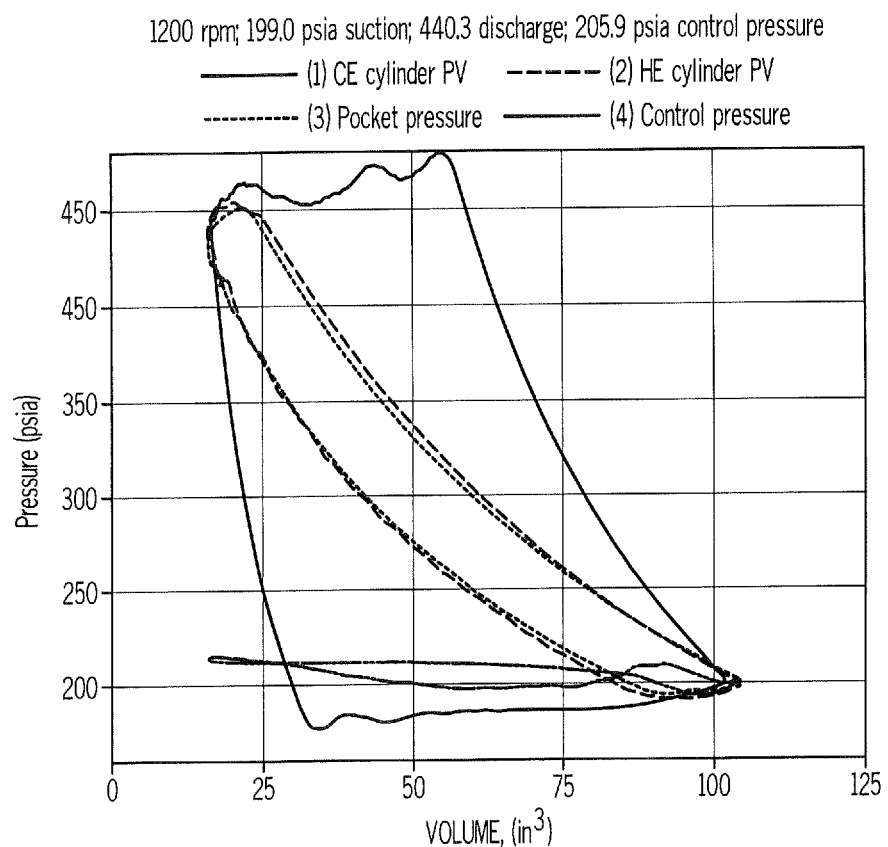

FIG. 24C contains similar plots to FIG. B at the same operating condition that resulted from setting the control pressure at 205.9 psia, which is the lowest capacity presented in the data from FIG. 24A. The much narrower plot (2) compared to plot (1) shows that the HE is significantly unloaded, in this case approximately 82% less than full capacity of the HE and approximately 41% less than the full combined HE and CE full capacity.

Figure 24D:
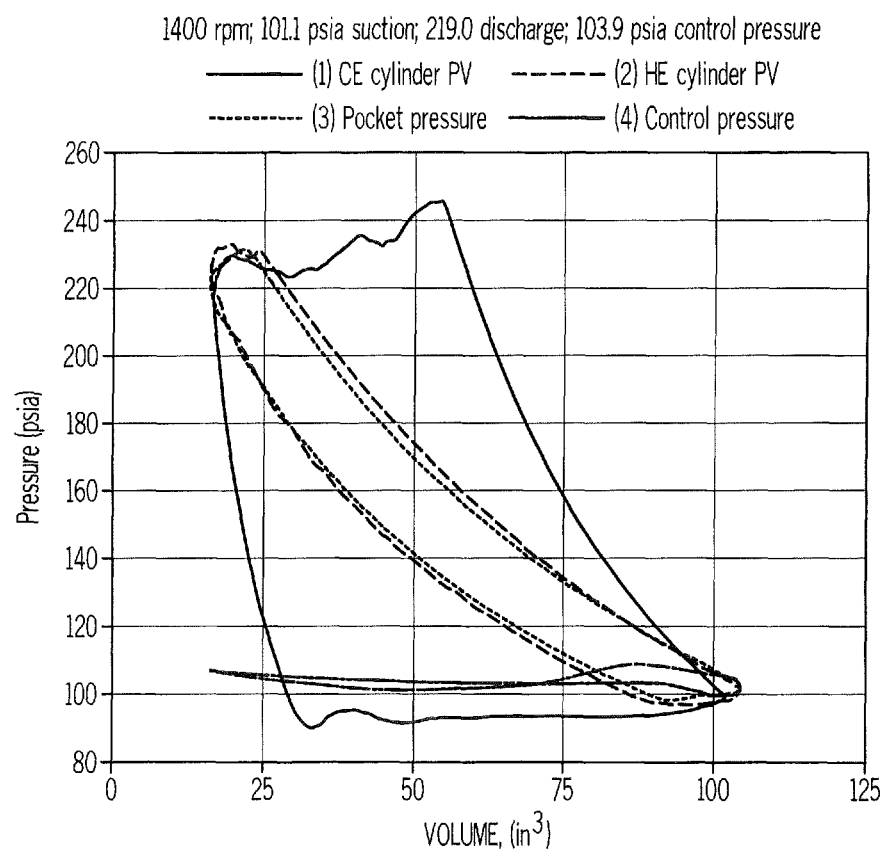

FIG. 24D contains the actual pressure vs. compressor cylinder volume plots that resulted from setting the control pressure at 103.9 psia for the previously described double-acting compressor cylinder and variable clearance system operating on nitrogen gas at 1400 rpm with a 101.1 psia suction pressure, 90° F. suction temperature and 219.0 psia discharge pressure. This data is representative evidence that the variable clearance system, with incorporation of the present invention, functions reliably at much higher operating speeds (1400 rpm) than were possible with the prior art variable clearance system (typically <750 rpm).

Various poppet and valve seat designs have been described above for reducing or eliminating poppet leakage and high impact stresses on the sealing surfaces of the poppets. As noted, the poppet and valve seat designs are preferably intended for application with unloader valve assemblies used with reciprocating compressors operating at 1000 rpm and higher; however, the novel features disclosed herein can also be applied to improve the performance and reliability on compressors operating below 1000 rpm. Also, while the present invention is specifically described for use in unloader valve assemblies at the head or outer end of a reciprocating compressor cylinder, it is envisioned that the poppet and valve seat features disclosed herein may also be applied on suction or discharge valve pockets, or on any pockets that communicate with the cylinder internal volume on either the head (outer) end or the frame (inner) end of the cylinder. While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope of the invention.

What is claimed is:

1. An unloader valve assembly for a reciprocating compressor, comprising:
   a) a clearance pocket having a volume;
   b) a support dome including a plurality of support dome ports, wherein each of the plurality of support dome ports communicates with the clearance pocket;
   c) a valve guard including:
      i) a plurality of poppet guide recesses;
      ii) a plurality of poppets, wherein each of the plurality of recesses houses one of the plurality of poppets, each of the plurality of poppets having an upper sealing surface and a lower sealing surface;
      iii) a plurality of valve guard seating surfaces for contacting the upper sealing surfaces of the plurality of poppets, wherein each of the plurality of valve guard seating surfaces contacts the upper sealing surface of one of the plurality of poppets;
  iv) a spacer plate comprising a plurality of posts for supporting the valve guard against the support dome, wherein the spacer plate and the support dome form a control pressure chamber, wherein each of the plurality of posts include a central port which communicates with one of the plurality of support dome ports;
  v) a plurality of control pressure ports, each of the plurality of control pressure ports located in the spacer plate between the plurality of posts, wherein each of the plurality of control pressure ports communicates with the control pressure chamber and with one of the plurality of poppet guide recesses; and
d) a valve seat including:
  i) a valve seat cushioning plate for reducing the magnitude of impact stresses acting on the head end of the poppet, the valve seat cushioning plate including a plurality of valve seat seating surfaces for contacting the lower sealing surfaces of the plurality of poppets, wherein each of the plurality of valve seat seating surfaces contacts the lower sealing surface of one of the plurality of poppets; and
  ii) a plurality of valve seat ports, wherein each of the plurality of valve seat ports communicates with a cylinder of the reciprocating compressor.

2. The unloader valve assembly of claim 1, wherein each of the plurality of posts of the spacer plate has a truncated triangle shape.

3. The unloader valve assembly of claim 1, the valve seat cushioning plate further comprising a cushioning element, wherein the cushioning element is selected from the group consisting of a cushioning pad, an O-ring, one or more springs, or a combination of thereof.

4. The unloader valve assembly of claim 1, wherein each of the plurality of valve seat ports has a diameter of between 0.380 inches and 0.410 inches, and more preferably 0.400 inches, and wherein each of the plurality of control pressure ports has a diameter of between 0.380 inches and 0.410 inches.

5. The unloader valve assembly of claim 4, wherein contact between each of the plurality of lower sealing surfaces and valve seat seating surface creates a circular contact line on the lower sealing surface of each of the plurality of poppets, wherein the mean diameter of the circular contact line of the lower sealing surface is between 0.020 inches and 0.045 inches larger than the valve seat port diameter.

6. The unloader valve assembly of claim 5, wherein each of the plurality of poppets has a lift area of between 97% and 103% of the valve seat port area.

7. The unloader valve assembly of claim 4, wherein contact between each of the plurality of upper sealing surfaces and valve guard seating surface creates a circular contact line on the upper sealing surface of each of the plurality of poppets, wherein the mean diameter of the circular contact line of the upper sealing surface is between 0.020 inches and 0.045 inches larger than the control pressure port diameter.

8. The unloader valve assembly of claim 7, wherein each of the plurality of poppets has a lift area of between 97% and 103% of the valve seat port area.

9. The unloader valve assembly of claim 1, wherein each of the plurality of valve seat seating surfaces has an angle of between 45 degrees and 35 degrees, and wherein the angle of each of the plurality of valve guard seating surfaces has an angle of between 45 degrees and 35 degrees.

10. The unloader valve assembly of claim 9, wherein each of the plurality of lower sealing surfaces has an angle of between 1.0 degree and 5.0 degrees larger than of the angle of each of the plurality of valve seat seating surfaces, and wherein each of the plurality of upper sealing surfaces has an angle of between 1.0 degree and 5.0 degrees larger than the angle of each of the plurality of valve guard seating surfaces.

11. The unloader valve assembly of claim 1, wherein each of the plurality of poppets is a pressure breaker poppet, each pressure breaker poppet comprising:
a) a head end having a first diameter, the head end including:
  i) the upper sealing surface for contacting one of the plurality of valve guard seating surfaces, wherein contact between the upper sealing surface and the valve guard seating surface creates a contact line on the upper sealing surface;
  ii) the lower sealing surface for contacting one of the plurality of valve seat seating surfaces, wherein contact between the lower sealing surface and the valve seat seating surface creates a contact line on the lower sealing surface;
b) a stem end having a second diameter which is smaller than the first diameter of the head end, the stem end including a plurality of steps radially protruding from the second diameter, wherein the plurality of steps are sized to fit inside one of the plurality of poppet guide recesses to reduce leakage around the poppet; and
c) a sealing guide stem having a third diameter which is smaller than the second diameter of the stem end, wherein the sealing guide stem is sized to fit within one of the plurality of control pressure ports in the spacer plate to reduce leakage around the poppet.

12. The unloader valve assembly of claim 11, wherein each of the plurality of steps are radial protrusions selected from the group consisting of square edges, sharp-edged labyrinth teeth, slanted protrusions with labyrinth teeth, or a combination thereof.

13. The unloader valve assembly of claim 11, wherein the poppet further includes an internal hollow volume for limiting the poppet mass and the impact stresses on the sealing surfaces.

14. The unloader valve assembly of claim 11, wherein the first diameter of the head end of the poppet is between 0.510 inches and 0.490 inches.

15. The unloader valve assembly of claim 1, wherein each of the plurality of poppets is a pressure breaker poppet, each pressure breaker poppet comprising:
a) a head end having a first diameter, the head end including:
  i) the upper sealing surface for contacting one of the plurality of valve guard seating surfaces, wherein contact between the upper sealing surface and the valve guard seating surface creates a contact line on the upper sealing surface;
  ii) the lower sealing surface for contacting one of the plurality of valve seat seating surfaces, wherein contact between the lower sealing surface and the valve seat seating surface creates a contact line on the lower sealing surface; and
b) a stem end having a second diameter which is smaller than the first diameter of the head end, the stem end including a plurality of steps radially protruding from the second diameter, wherein the plurality of steps are sized to fit inside one of the plurality of poppet guide recesses to reduce leakage around the poppet.

16. The unloader valve assembly of claim 15, wherein each of the plurality of steps of the poppet are radial protrusions selected from the group consisting of square edges, sharp-edged labyrinth teeth, slanted protrusions with labyrinth teeth, or a combination thereof.

17. The unloader valve assembly of claim 15, wherein the poppet further includes an internal hollow volume for limiting the poppet mass and the impact stresses on the sealing surfaces.

18. The unloader valve assembly of claim 15, wherein the first diameter of the head end of the poppet is between 0.510 inches and 0.490 inches.

19. The unloader valve assembly of claim 1, wherein each of the plurality of poppets is an impact tolerant self-sealing poppet, each impact tolerant self-sealing poppet comprising:
 a) a head end having an outer diameter, the head end including a plurality of steps radially protruding from the outer diameter of the head end; and
 b) a stem end having an outer diameter that is substantially the same as the outer diameter of the head end, the stem end including a plurality of steps radially protruding from the outer diameter of the stem end.

20. The unloader valve assembly of claim 19, wherein each of the plurality of steps are radial protrusions selected from the group consisting of square edges, sharp-edged labyrinth teeth, slanted protrusions with labyrinth teeth, or a combination thereof.

21. The unloader valve assembly of claim 19, wherein the poppet further includes an internal hollow volume for limiting the poppet mass and the impact stresses on the sealing surfaces.

22. The unloader valve assembly of claim 19, wherein the outer diameter of the head end and of the stem end of the poppet is between 0.510 inches and 0.490 inches.

23. The unloader valve assembly of claim 1, wherein each of the plurality of poppets is an impact tolerant self-sealing poppet, each impact tolerant self-sealing poppet comprising:
 a) a head end having an outer diameter, the head end comprising a head end piece including a central hollow portion having an inner diameter;
 b) a stem end having an outer diameter that is substantially the same as the outer diameter of the head end, the stem end comprising a stem end piece including a central hollow portion having an inner diameter that is substantially the same as the inner diameter of the head end piece; and
 c) a central core positioned between the head end piece and the stem end piece, the central core comprising a hollow portion, a plurality of steps radially protruding from the outer diameter of the central core, and bulbous-shaped ends for connecting to the head end piece and the stem end piece, wherein the bulbous-shaped ends have a larger outer diameter than the inner diameters of the head end piece and the stem end piece.

24. The unloader valve assembly of claim 1, wherein each of the plurality of poppets is a diaphragm seal poppet, each diaphragm seal poppet comprising:
 a) a head end having an outer diameter;
 b) a stem end having an outer diameter that is substantially the same as the outer diameter of the head end; and
 c) a flexible diaphragm seal projecting from the stem end, the diaphragm seal comprising:
  i) a bulbous outer diameter clamped into a recess of the valve guard;
  ii) a seating recess for contacting the valve guard seating surface; and
  iii) at least one strain relief loop positioned between the bulbous outer diameter and the seating recess.

\* \* \* \* \*